US012686242B2

(12) United States Patent
Stabenow et al.

(10) Patent No.: US 12,686,242 B2
(45) Date of Patent: Jul. 21, 2026

(54) AIR DRYER HOUSING, AIR DRYER ASSEMBLY, COMPRESSED-AIR SUPPLY SYSTEM, AND VEHICLE

(71) Applicant: ZF CV Systems Europe BV, Brussels (BE)

(72) Inventors: Uwe Stabenow, Laatzen (DE); Klaus Bredbeck, Landesbergen (DE)

(73) Assignee: ZF CV Systems Europe BV, Brussels (BE)

( * ) Notice: Subject to any disclaimer, the term of this patent is extended or adjusted under 35 U.S.C. 154(b) by 337 days.

(21) Appl. No.: 18/329,141

(22) Filed: Jun. 5, 2023

(65) Prior Publication Data

US 2023/0311610 A1 Oct. 5, 2023

Related U.S. Application Data

(63) Continuation of application No. PCT/EP2021/083932, filed on Dec. 2, 2021.

(30) Foreign Application Priority Data

Dec. 21, 2020 (DE) ..................... 10 2020 134 359.0

(51) Int. Cl.
*B60G 17/052* (2006.01)
*B60G 11/30* (2006.01)

(52) U.S. Cl.
CPC .......... *B60G 17/0523* (2013.01); *B60G 11/30* (2013.01); *B60G 2500/203* (2013.01); *B60G 2600/66* (2013.01)

(58) Field of Classification Search
CPC ................ B60G 17/0523; B60G 11/30; B60G 2600/66; B60G 2500/203
See application file for complete search history.

(56) References Cited

U.S. PATENT DOCUMENTS

2013/0255787 A1 10/2013 Frank et al.
2013/0276899 A1 10/2013 Frank et al.
(Continued)

FOREIGN PATENT DOCUMENTS

CN 101417595 A 4/2009
CN 101725756 A 6/2010
(Continued)

OTHER PUBLICATIONS

International Search Report of the European Patent Office dated Apr. 5, 2022 for international application PCT/EP2021/083932 on which this application is based.

(Continued)

*Primary Examiner* — Vishal R Sahni
(74) *Attorney, Agent, or Firm* — Walter Ottesen, P.A.

(57) ABSTRACT

An air dryer housing includes a desiccant container fillable with desiccant and includes a port device for a compressed-air supply with a compressed-air flow. The port device is configured for connecting the air dryer housing to the compressed-air supply. The port device is connectable pressure-tight to the desiccant container. The port device has, at the desiccant side, a valve element which projects into the desiccant container and in which a valve piston is movable. The valve element and the valve piston form a ventilation valve unit that is configured as a pneumatic relay valve. The port device is configured to be connectable to the compressed-air supply system, and the desiccant container can be passed through by a compressed-air flow in a first direction when the valve piston is in a first position and in a second direction when the valve piston is in a second position.

16 Claims, 12 Drawing Sheets

(56)     References Cited

U.S. PATENT DOCUMENTS

2013/0318954 A1* 12/2013 Frank ................. B60G 17/0155
                                                    60/407
2014/0373718 A1    12/2014 Bergemann et al.
2017/0246928 A1     8/2017 Frank et al.
2020/0079170 A1*    3/2020 Asharam .............. B60T 17/004

FOREIGN PATENT DOCUMENTS

DE       10 2005 062 573 A1      6/2007
DE       10 2011 109 500 A1      6/2012
DE       10 2012 005 345 A1      6/2013
DE          102012005308 A1  *   6/2013    ........... B01D 53/261
EP             2 651 671 A1     10/2013
WO       WO-2012079698 A1  *    6/2012    ............ F15B 21/048
WO       WO-2018109511 A1  *    6/2018    ......... B60G 17/0523

OTHER PUBLICATIONS

English translation and International Preliminary Report on Patentability of the International Bureau of WIPO dated Jun. 13, 2023 for international application PCT/EP2021/083932 on which this application is based.
English translation and Written Opinion of the International Searching Authority dated Apr. 5, 2022 for international application PCT/EP2021/083932 on which this application is based.
English translation and Office action of the Chinese Patent Office dated Feb. 28, 2026 in corresponding Chinese patent application 202180083485.3.

* cited by examiner 100, 102, 104

100, 102, 104

230

110

240

140, 141

DL, RF

RR, RR3

RR, RR2

RL, RF

RR, RR1, PA, PMIN

RR, RR4

AIR DRYER HOUSING, AIR DRYER ASSEMBLY, COMPRESSED-AIR SUPPLY SYSTEM, AND VEHICLE

CROSS-REFERENCE TO RELATED APPLICATIONS

This application is a continuation application of international patent application PCT/EP2021/083932, filed Dec. 2, 2021, designating the United States and claiming priority from German application 10 2020 134 359.0, filed Dec. 21, 2020, and the entire content of both applications is incorporated herein by reference.

TECHNICAL FIELD

The disclosure relates to an air dryer housing, an air dryer arrangement, a compressed-air supply system and a vehicle.

BACKGROUND

Air dryer housings, in particular for vehicles, are generally known and are preferably configured to form an air dryer arrangement, in particular for the purposes of extracting moisture from compressed air using a desiccant.

DE 10 2005 062 573 A1 describes a control valve, in particular air pressure control valve for a motor vehicle, having an air dryer housing of the type mentioned in the introduction. In the document, the air dryer housing is formed by a valve housing which is closed via a housing cover, and has a valve piston which is displaceable in the valve housing toward the housing cover, wherein a cover seal is provided which seals off the housing cover with respect to the valve housing. Such an approach advantageously already provides, in principle, for parts of a control valve which is suitable for ventilation to be integrated into a housing cover, which is however still mounted on top of the dryer housing. This however still has potential for improvement, in particular with regard to the use of available space at the desiccant side.

US 2013/0255787 and US 2017/0246928 describe a compressed-air supply system for operating a pneumatics system, in particular an air spring system of a vehicle, including an air feed and an air compressor for supplying compressed air to a compressed-air feed, including a ventilation line having a ventilation valve arrangement which is in the form of a controllable solenoid valve arrangement and which has a solenoid part, a pneumatics part and a ventilation port for discharging air, and including a compressed-air supply line, having an air dryer and a compressed-air port for supplying compressed air to the pneumatics system, wherein, when the solenoid part of the solenoid valve arrangement is not actuated, the pneumatics part of the solenoid valve arrangement is opened. In the approach described in US 2013/0255787 and US 2017/0246928, provision is made for the pneumatics part, which can be actuated directly by way of the solenoid part, in a branch line of the compressed-air supply line between a pressure-side valve port and a control-side valve port of the branch line to be opened. In an embodiment of the approach described in US 2013/0255787 and US 2017/0246928, provision is already advantageously made, in principle, for the ventilation valve arrangement to be arranged in an integrated manner on the dryer housing but not within the desiccant container. Also, in the approach described in US 2013/0255787 and US 2017/0246928, the ventilation valve arrangement is configured as a solenoid valve arrangement.

Despite such approaches that already allow, in principle, for an improved configuration, air dryer housings still have potential for improvement.

DE 10 2012 005 345 A1 describes another compressed-air supply system which, by contrast to that mentioned above, has a double-chamber dryer housing and is configured, in a progressive manner, for operating a pneumatics system, in particular an air spring system of a vehicle. This compressed-air supply system having a double-chamber dryer housing has the following: a compressed-air feed, a compressed-air port to the pneumatics system, and a ventilation port to the surroundings; a pneumatics main line between the compressed-air feed and the compressed-air port, which pneumatics main line has an air dryer and a pilot-operated check valve of a valve arrangement; and, between the compressed-air port and the ventilation port, a ventilation line having a ventilation valve of a valve arrangement. In the document, provision is made for the valve arrangement to be arranged in a valve housing module, wherein the valve housing module can be attached in modular fashion by way of a flange to the compressed-air supply system, wherein the valve housing module has a stepped bore which is arranged opposite the flange and in which a stepped relay piston is arranged, so as to be movable by pressure actuation, to form the pilot-operated check valve and the ventilation valve, wherein a sequence of successive portions, having a reduced cross section in each case, of the stepped bore is formed along a valve axis, wherein the sequence is assigned a sequence of successive portions, having a reduced cross section in each case, of the relay piston along the valve axis.

Despite such approaches, which are already advantageous and which in particular allow for ventilation and regeneration of an air dryer arrangement, air dryer housings still have potential for improvement.

Air dryer housings have potential for improvement in particular with regard to a construction which is as compact as possible and which saves the most structural space possible, easy assembly, low generation of noise during operation, low susceptibility to faults, and/or the most effective drying possible.

It would be desirable to improve the function of an air dryer housing with regard to at least one of the stated aspects. It is sought in particular to realize a structural-space-saving construction of an air dryer arrangement.

SUMMARY

It is an object of the disclosure to specify an improved air dryer housing in the case of which at least one of the stated aspects is improved.

An object relating to the air dryer arrangement is achieved by the disclosure, in a first aspect, with an air dryer arrangement. The disclosure proceeds from an air dryer housing including a desiccant container for filling with desiccant and including a port device, in particular a port flange, for a compressed-air supply with a compressed-air flow, in particular for an air dryer arrangement, wherein the port device is configured for connecting the air dryer housing to the compressed-air supply desiccant container.

According to the disclosure, in the air dryer arrangement, provision is made whereby the port device is connectable, on a desiccant-side container side, in pressure-tight fashion to the desiccant container, wherein the port device has, at the desiccant side, a valve element which projects into the desiccant container and in which a valve piston is movable, and the port device is configured to be mechanically and/or pneumatically connectable, at a port side at a system side, to the compressed-air supply system, and the desiccant container can be passed through by a compressed-air flow in a first direction, in particular a delivery direction, when the valve piston is in a first position, in particular a delivery position, and in a second direction, in particular a regeneration direction, when the valve piston is in a second position, in particular a regeneration position.

The disclosure is based on the recognition that a configuration which saves the most structural space possible, and/or which is as weight-saving as possible, is advantageous for an air dryer housing of an air dryer arrangement, in particular when used in a vehicle.

The valve element and the valve piston, in particular the ventilation valve unit, which are important for effective regeneration of the desiccant of the air dryer arrangement, always contribute significantly to structural space and weight in air dryer arrangements and/or air dryer housings according to the prior art, in particular owing to pneumatic lines and a housing for the ventilation valve unit.

The disclosure encompasses the recognition that, by virtue of the port device having, at the desiccant side, a valve element which projects into the desiccant container, it is possible for the valve element and thus the valve piston, in particular of the ventilation valve unit, to be integrated into the desiccant container of the air dryer housing. Structural space and weight can thus advantageously be saved. This is the case in particular because a separate housing for the ventilation valve unit can be omitted, because the air dryer housing entirely or partially houses or encloses the ventilation valve unit and thus performs the function of a housing for the ventilation valve unit too.

By virtue of the valve element being arranged so as to project into the desiccant container, the ventilation valve unit desiccant container is advantageously positioned close to the desiccant, whereby effective regeneration of the desiccant is possible in an improved manner. In particular, owing to the proximity between the ventilation valve unit and the desiccant, less air, in particular less dead air, is required to flow through the desiccant and to transport the absorbed moisture away, whereby less compressed air—which has been previously compressed with expenditure of energy—needs to be consumed for the purposes of regeneration. Owing to this reduced consumption of air for ventilation purposes, the duration and intensity of the noise emissions during the ventilation process are advantageously also reduced.

Owing to the valve element desiccant container being arranged so as to project into the desiccant container in accordance with the concept of the disclosure, in particular to form the ventilation valve unit, the spacing between the desiccant and pneumatic ports, in particular of the port device, can advantageously be increased, whereby the spacing from the desiccant to further components of the compressed-air supply system that may warm up during operation, in particular a cylinder of the compressor, can likewise be increased. In this way, warming of the desiccant by surrounding components can advantageously be reduced, which can advantageously reduce the dew point and further increase the effectiveness of the regeneration.

Noises generated by the ventilation valve unit which is formed as a pneumatic relay valve and which has the valve element and the valve piston, and in particular by the axial movement of the valve piston, are also advantageously dampened by the air dryer housing, and thus made less perceptible from the outside, owing to the integration of the valve element into the desiccant container.

Owing to at least one of the abovementioned advantageous increases in effectiveness and/or efficiency of the dryer arrangement with an air dryer housing according to the concept of the disclosure, it is advantageously possible—in particular while at least maintaining the same dryer performance—to omit a quantity of desiccant, in particular the quantity that is not available in the air dryer housing owing to the presence of the ventilation valve unit within the air dryer housing. This means in particular that, owing to the increases in efficiency and/or effectiveness achieved in accordance with the concept of the disclosure, the space required for the ventilation valve unit can be created simply as a result of the omission of desiccant within the air dryer housing, and in particular, a desiccant container does not necessarily need to be enlarged despite the integration of the valve element and the valve piston.

In particular, the second direction, in particular regeneration direction, is opposite to the first direction, in particular delivery direction. "Mechanically connectable" means, in particular, "fastenable". The regeneration direction is opposite to the delivery direction in particular in the region of the container interior space of the desiccant container—in particular in that part of the container interior space, the so-called desiccant bed, which receives the desiccant. The valve piston is in particular received entirely in the valve element.

The dryer arrangement is in particular a regenerative dryer arrangement. The air dryer housing is configured in particular for a regenerative dryer arrangement. A regenerative dryer arrangement is advantageously configured to be regenerated at regular time intervals, in particular by a regeneration flow, and thus advantageously has a relatively long service life, in particular in relation to single-use dryer cartridges. In particular, the service life of a regenerative dryer arrangement corresponds to the service life of the compressed-air supply or of the compressed-air supply system or of the vehicle in which the regenerative dryer arrangement is installed. The valve element is advantageously fixedly connected to the port device.

In particular, provision is made for the port device and the desiccant container to be configured to fully house the air dryer housing and/or the air dryer arrangement, in particular to jointly form an outer delimitation of a container interior space of the air dryer housing.

In particular, provision is made whereby the port device, in particular the port flange, is mechanically connectable for the pneumatic connection of the desiccant container via the port device to the compressed-air supply with a compressed-air flow, in particular a compressed-air supply system.

In an embodiment, provision is made whereby the port device integrally forms the valve element that projects into the desiccant container. This preferably means that the port device, in particular the port flange or the dryer flange of a port device configured as a port assembly, and the valve element are formed as an integral, in particular cohesively connected component, preferably as an injection-molded plastics part. Such an integral component can advantageously be produced easily. The desiccant container may advantageously likewise be configured as an injection-molded plastic part. In such an embodiment, it is in particular advantageously achieved that the desiccant container, and the port device that is connected to the desiccant container in the assembled state, fully encompass the other components of the air dryer arrangement, in particular the desiccant and the ventilation valve unit.

In an embodiment, provision is made whereby the ventilation unit projects entirely into the desiccant container, in particular is arranged entirely within the desiccant container. This means in particular that the ventilation valve unit is entirely surrounded by the desiccant container and/or by the air dryer housing that is formed from the desiccant container and the port device. In such an embodiment, the desiccant container and/or the port device advantageously fully performs the function of a housing for the ventilation valve unit. In particular, a valve element diameter of the ventilation valve unit, which in particular has valve element and assembly clips, is smaller, preferably slightly smaller, than an internal desiccant container diameter of the container interior space of the desiccant container, in particular of the first chamber and/or of the second chamber. In particular, the valve element diameter is smaller than the desiccant container diameter such that a resulting flow gap has a cross section that is suitable for a required compressed-air flow. In particular, between the desiccant container and the ventilation valve arrangement, there is provided at least one flow gap through which a compressed-air flow can flow past the ventilation valve unit, in particular between the desiccant and the pneumatics port and/or between a regeneration passage and the desiccant.

Provision is advantageously made whereby the desiccant container has a container interior space that is divided into a first chamber and a second chamber. This is preferably achieved via a web which extends along a longitudinal extent of the desiccant container, wherein the first chamber and the second chamber are pneumatically connected, in particular via at least one opening in the web. In particular, the first chamber and the second chamber are connected pneumatically in series.

Such an air dryer arrangement having a first chamber and a second chamber may be configured in particular as a double-chamber air dryer. The first and the second chamber are themselves preferably of substantially identical dimensions, and in particular have a substantially hollow cylindrical container interior space. A hollow cylindrical container interior space is advantageously suitable for receiving a ventilation valve unit, in particular with a substantially cylindrical valve element.

In an air dryer housing, it is preferable for several, in particular all, pneumatic ports to be arranged on one side, in particular on a port side of the port device, which advantageously allows easy assembly. It is also preferable for several, in particular all, mechanical connections to be arranged on the port device. The mechanical connections are formed in particular as installation bores, preferably through bores and/or threaded bores. The port device, in particular the port flange, is preferably configured for fully fastening the air dryer housing in particular to a compressed-air supply system and/or compressed-air supply unit, wherein the installation bores may optionally additionally extend into the desiccant container, which is arranged behind the port device. In particular, the desiccant container may have screw receptacles which are arranged coaxially with respect to the installation bores of the port device and which are configured in particular as threaded bores.

In an embodiment, other air dryer housings of a double-chamber air dryer are not restricted to a parallel arrangement of first and second chambers. Other structural forms of air dryer housings of a double-chamber air dryer are also possible, for example with first and second chambers arranged in series along an axis or concentrically. In preferred embodiments, the air dryer housing is configured for a single-chamber air dryer.

In particular, provision is made whereby the port device, in particular the port flange or a dryer flange, has a first port connection piece and a second port connection piece, wherein the first port connection piece has, in particular, a first preload spring receptacle, and the second port connection piece is formed by the valve element. In particular, the first port connection piece has a compressor port.

In particular, a housing seal is provided which can be arranged between the port device, in particular the port flange, and the desiccant container, which housing seal is configured to separate the individual recesses on the port side of the port flange from one another in pressure-tight fashion. In particular, for this purpose, the housing seal has a geometry corresponding to the recesses on the port side.

In an embodiment, provision is made whereby the port device is configured as a port flange. A port flange may be configured as one part, in particular as a single piece. A port flange may include multiple port flange segments, wherein the port flange segments are configured to be connectable to one another in pressure-tight fashion and/or connectable to the desiccant container. For example, the port flange may have two port flange segments, with each port flange segment being assigned to a port connection piece.

In an embodiment, provision is made whereby the port device is configured as a port assembly having a dryer flange and a compressor flange. In particular, at least one pneumatic port is arranged in the dryer flange. In particular, the at least one pneumatic port in the dryer flange is assigned a corresponding pneumatic remote port in the compressor flange, and each pneumatic port is connected to the respectively corresponding pneumatic remote port, in particular via a connecting line. A connecting line may advantageously be configured as a hose or pipe. A port device configured as a port assembly advantageously makes it possible to arrange the air dryer housing remotely from a compressed-air supply, in particular from a compressed-air supply system or a compressed-air supply unit, and thus advantageously offers increased flexibility for the use of the available structural space. A connecting line advantageously has a line length less than or equal to 600 mm, preferably less than or equal to 300 mm. A shorter line length advantageously leads to lower pressure losses.

In an embodiment, provision is made whereby the port device, in particular the port flange, has at least one pneumatic port, in particular a compressor port, a pneumatics port, a ventilation port and/or a regeneration port, wherein the at least one pneumatic port is configured preferably as recess, in particular as at least one channel and/or at least one bore, in the port device, in particular in the port flange, preferably on a port side. A recess is to be understood to mean a configuration feature generated by removal of material, in particular a hole and/or a bore and/or a channel. A recess may advantageously be produced using a primary forming production process, for example a casting process, in particular a plastics injection molding process.

In particular, in order for a compressed-air flow to be dried by way of the desiccant, the compressed-air flow can pass through the desiccant container in a delivery direction from a compressor port to a pneumatic support, which is in particular connectable to a pneumatics main line. In particular, in the regeneration position, a compressed-air flow can pass through the desiccant container in a regeneration direction, counter to the delivery direction, from a regeneration port to the compressed-air port, in particular in order for the desiccant to be regenerated.

In an embodiment, a regeneration throttle is provided which is formed in particular as a bore of the port device, in particular in the port flange. The regeneration throttle is in particular arranged downstream of the desiccant in the delivery direction, in particular between the regeneration port and that part of the container interior space which receives the desiccant. The compressed-air flow passing in the regeneration direction is advantageously expanded via the regeneration throttle, in order to allow effective drying of the desiccant in accordance with the principle of pressure-swing adsorption. For this purpose, the regeneration throttle has a relatively small nominal width, for example between 1.2 mm and 2 mm. The nominal width of the regeneration throttle is in particular smaller than, and is for example half, an effective nominal width of the ventilation valve unit. Here, the effective nominal width of the ventilation valve unit is defined in particular by the cross section of the flow gap in a flow direction, that is, in the delivery direction and/or regeneration direction.

In an embodiment, provision is made whereby the valve element has a valve element diameter that is smaller than a desiccant container diameter of the desiccant container, such that, in a radial intermediate space between the valve element and the desiccant container, there is formed a flow gap for guiding the compressed-air flow past the valve element. In such an embodiment, the valve element is arranged such that the compressed-air flow can flow around the periphery thereof, specifically both in the delivery direction and in the regeneration direction. In particular, flow does not pass axially through the valve piston, either in the delivery direction or in the regeneration direction.

In an embodiment, provision is made whereby the valve element and the valve piston form a ventilation valve unit that is configured as a pneumatic relay valve. In such an embodiment, a compact ventilation valve unit can be realized in particular with little outlay on apparatus, for example as compared with a solenoid valve arrangement.

In an embodiment, provision is made whereby the valve element has a relay segment and the valve piston has a piston relay segment, wherein the valve piston is guided axially movably in the relay segment by way of the piston relay segment, and/or the valve element has a switching segment and the valve piston has a piston switching segment, wherein the valve piston is guided axially movably in the switching segment by way of the piston switching segment. In particular, the piston relay segment is of cylindrical configuration and the relay segment is of geometrically corresponding hollow cylindrical configuration. In particular, the piston switching segment is of cylindrical configuration and the switching segment is of geometrically corresponding hollow cylindrical configuration. In such an embodiment, axial guidance is advantageously made possible. In the case of a valve piston with a piston relay segment and with a piston switching segment, increased stability is advantageously made possible, and it is in particular then possible for the piston relay segment and the piston switching segment to each have only a small axial extent, with reliable axial guidance nevertheless being made possible without a high risk of jamming during an axial movement.

Provision is advantageously made whereby the valve piston has a relay surface and a switching surface, wherein the relay surface is larger than the switching surface, and compressed air can be applied to the relay surface via the regeneration port in order to move the valve piston into the regeneration position, in which the switching surface lifts off from a ventilation valve seat of the valve element, in particular in order to establish a pneumatic connection between the compressor port and a ventilation port. The compressed air for charging the regeneration port is in particular a compressed-air flow in the regeneration direction, and originates in particular from the pneumatics system, in particular from the pneumatics main line, from a pressure accumulator and/or from at least one air spring of an air spring system. By configuring the area ratio of the relay surface with respect to the switching surface, it is advantageously possible for a control pressure, which prevails in particular at the relay surface, to be suitably set in relation to a pressure for switching, which prevails in particular at the switching surface. In particular, the valve piston is substantially of stepped cylindrical configuration.

In an embodiment, a restoring spring is provided which holds the valve piston in the delivery position and which exerts a restoring force on the valve piston in particular as the valve piston moves into a regeneration position of the valve piston. The restoring spring may advantageously be configured to push the valve piston back onto the ventilation valve seat, in particular when no pressure or a pressure less than or equal to a minimum pressure prevails at the regeneration port.

Via a restoring spring, the valve piston, in particular the ventilation valve unit, can advantageously perform the function of a pressure regulator. In particular, the restoring force that is exerted on the valve piston by the restoring spring can be influenced through the selection of a restoring spring constant. A deactivation pressure of the air dryer arrangement can be set through the selection of the restoring spring constant of the restoring spring. In particular, the deactivation pressure is that air pressure, prevailing at the regeneration port, above which the valve piston lifts off from the ventilation valve seat and the ventilation valve unit thus switches into the ventilation position.

Also, through the selection of the restoring spring constant, a minimum pressure can be defined at which—when this minimum pressure prevails at the regeneration port—the valve piston is moved back into the delivery position and closes the ventilation valve seat. By selecting an adequately high minimum pressure, it is advantageously possible for compressed air that is contained in the pneumatics system, in particular compressed air that is stored in air springs of an air spring system, to be prevented from escaping completely therefrom, which could otherwise lead to damage to the pneumatic system, in particular to the air spring system.

Via a corresponding restoring spring, these pressure regulator functions, which are based on the deactivation pressure and/or the minimum pressure and which are relevant for the safety and functioning of the compressed-air supply system, can advantageously be implemented mechanically, in particular without further electronic regulating devices. Embodiments with further, in particular electronically actuated, valves are nevertheless also possible within the scope of the disclosure.

In an embodiment, provision is made whereby
the valve element, in particular the ventilation valve unit, has a covering diaphragm that is fastened, in particular in pressure-tight fashion, to the valve element in order to form a valve interior space, wherein
the covering diaphragm has, on the side facing toward the valve interior space, a restoring spring receptacle for receiving the restoring spring, and/or,
on the side averted from the valve interior space, a preload spring receptacle for receiving a preload spring, in particular a second preload spring receptacle for receiving a second preload spring, wherein the preload spring is configured to apply a preload force to the desiccant. The covering diaphragm is advantageously configured to be impermeable to air. The covering diaphragm is advantageously fastened on the valve element via at least one assembly clip. The preload spring receptacle covering diaphragm, in particular the second preload spring receptacle, in particular corresponds, in terms of its shape used for receiving the preload spring, to a preload spring receptacle in a conventional air dryer housing, in particular to a first preload spring receptacle. Owing to the covering diaphragm with the preload spring receptacle, the ventilation valve unit can be integrated into a desiccant container, advantageously without the need for structural alterations to the desiccant container.

In advantageous embodiments in which the air dryer housing is configured for a double-chamber air dryer and has a first and a second chamber, the first retention plate and the second retention plate are arranged differently, in particular at different axial positions along the longitudinal extent. This is owing to the fact that the ventilation valve unit projects into the second chamber. In such embodiments, there are different resulting desiccant fill levels in the first chamber and in the second chamber.

The restoring spring receptacle and/or the preload spring receptacle are advantageously configured as cylindrical or hollow cylindrical stamped indentations in the covering diaphragm. Owing to the thin-walled, diaphragm-like form of the covering diaphragm, it is advantageously possible for both the restoring spring and the preload spring to be received via one component, specifically the covering diagram, specifically preferably in an overlapping manner in an axial direction. Via such a form of the covering diaphragm, the restoring spring and the preload spring can overlap in an axial direction, with a further advantageously structural-space-saving arrangement of the ventilation valve unit thus being realized. The covering diaphragm is formed from a suitable, in particular adequately stable, material, for example sheet metal, in particular sheet steel, and/or a plastic. Via a covering diaphragm, the valve element can, aside from its pneumatic function in the ventilation valve unit, advantageously also be used as a mechanical receptacle for the preload spring, and in advantageous embodiments also for the restoring spring. This, in particular in a synergistic manner with the arrangement of the valve element in the container interior space, results in a space-saving arrangement of the preload spring and/or of the restoring spring.

In an embodiment, a damping cushion is provided which is arranged between the ventilation valve seat and the switching surface and which is formed in particular from an elastomer, and/or a damping disk is provided which is arranged between the valve piston and the covering diaphragm and which is formed in particular from an elastomer. Via a damping cushion, the axial movement of the valve piston as it sets down onto the ventilation valve seat can be advantageously dampened, whereby quieter and more material-conserving operation of the ventilation valve unit is advantageously achieved. A damping cushion is applied, in particular adhesively bonded, as a planar material layer onto the switching surface, in particular the entire switching surface, of the valve piston. Analogously to the damping cushion, a damping disk can be advantageously used to dampen the axial movement of the valve piston as it reaches the covering diaphragm. A damping disk is configured in particular as a planar, annular element, and is preferably fastened, in particular adhesively bonded, to the covering diaphragm.

In an embodiment, a regeneration switching valve, which is configured in particular as a 2/2 directional solenoid valve, is provided, wherein the regeneration switching valve is configured to selectively establish a pneumatic connection between a pneumatics main line and/or a pneumatics system and/or a pressure accumulator, at one side, and the regeneration port at the other side. Via a regeneration switching valve, a regeneration of an air dryer arrangement can advantageously be performed by selective actuation of the regeneration port, in particular via a control unit.

In a second aspect, the disclosure is directed to an air dryer arrangement, in particular of a compressed-air supply system for operating a pneumatics system with a compressed-air flow, in particular of an air spring system of a vehicle, preferably of a passenger motor vehicle, including an air dryer housing according to the first aspect of the disclosure, and a desiccant, wherein the desiccant is in particular in loose and/or granular form.

In a third aspect, the disclosure is directed to a compressed-air supply system for a vehicle for providing a supply to a pneumatics system, in particular to an air spring system of a vehicle including an air dryer housing according to the first aspect of the disclosure or an air dryer arrangement according to the second aspect of the disclosure.

In a fourth aspect, the disclosure is directed to a vehicle, in particular a passenger motor vehicle, including an air dryer housing according to the first aspect of the disclosure and/or an air dryer arrangement according to the second aspect of the disclosure and/or a compressed-air supply system according to the third aspect of the disclosure.

The advantages of the air dryer housing according to the first aspect of the disclosure are advantageously utilized in the air dryer arrangement according to the second aspect of the disclosure and/or the compressed-air supply system according to the third aspect of the disclosure and/or the vehicle according to the fourth aspect of the disclosure. In particular, a structural-space-saving and/or weight-saving construction that results from the air dryer housing according to the first aspect of the disclosure leads to advantages in an air dryer arrangement according to the second aspect of the disclosure and/or in a compressed-air supply system according to the third aspect of the disclosure and/or in a vehicle according to the fourth aspect of the disclosure, in particular because, in vehicles, the weight and structural space of such components of compressed-air supply systems are critical configuration parameters, the reduction of which is advantageous.

In a compressed-air supply system according to the third aspect of the disclosure, the air dryer housing according to the first aspect of the disclosure can advantageously be used to create a greater spacing between the desiccant and other components of the compressed-air supply system, in particular a compressor, in order to thus reduce warming of the desiccant.

BRIEF DESCRIPTION OF DRAWINGS

The invention will now be described with reference to the drawings wherein.

DETAILED DESCRIPTION

Figures 1, 1A:
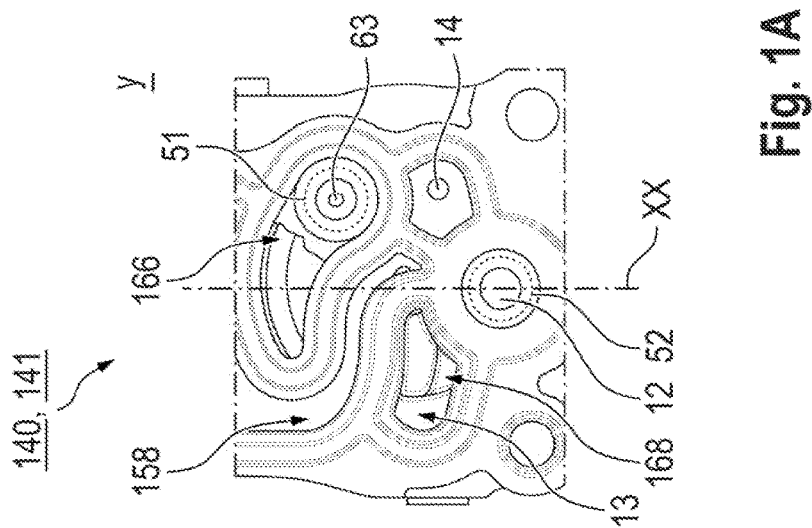
FIG. 1 shows an air dryer arrangement having an air dryer housing according to an embodiment corresponding to the concept of the disclosure.
FIG. 1A shows a detail of the port device, formed as a port flange, of the embodiment of the air dryer arrangement shown in FIG. 1, in a plan view in the region of the second chamber.

FIG. 1 shows an air dryer housing 104 according to an embodiment corresponding to the concept of the disclosure for forming an air dryer arrangement 100. In the present case, the air dryer arrangement 100 is in the form of a double-chamber air dryer 102, in which a desiccant container 110 has two substantially cylindrical segments, arranged adjacent to one another, to form a first chamber 230, which extends along a first chamber axis AK1, and a second chamber 240, which extends along a second chamber axis AK2 running parallel to the first chamber axis AK1.

The first chamber axis AK1 and the second chamber axis AK2 run parallel to a longitudinal extent LE of the air dryer housing 104 and of the air dryer arrangement 100. The first chamber 230 and the second chamber 240 are separated from one another by a web 220, wherein the desiccant container 110 however has at least one opening 225 in the web 220 in order to pneumatically connect the first chamber 230 and the second chamber 240. The pressure vessel 110 and in particular the first chamber 230 and the second chamber 240 are configured to receive a granular and/or loose desiccant 300. That part of the pressure vessel 110 which receives the desiccant 300 is also referred to as the desiccant bed. Via a desiccant 300, moisture can advantageously be extracted from a compressed-air flow DL that passes through the desiccant 300.

The air dryer housing 104 has a port device 140 in the form of a port flange 141, which is connectable in pressure-tight fashion to the desiccant container 110 at an open end side of the desiccant container 110. For this purpose, a desiccant-side container side 145 of the port device 140 can be connected to the open end side of the desiccant container 110. For an improved seal, a housing seal 192 may advantageously be arranged on the port device 140 at the desiccant side, between the port device 140 and the desiccant container 110. The opening 225, in particular the first opening 225.1 and the second opening 225.2, are arranged in the web 220 preferably oppositely from the side of the port device 140 as viewed in the direction of the longitudinal extent LE, in order to allow the desiccant 300 to be passed through as completely as possible by flow.

In the first chamber 230 and the second chamber 240, there is arranged in each case one retention plate 139 through which flow can pass and which is in each case pushed against the desiccant 300 via a preload spring 138. In the first chamber 230, there is arranged a first retention plate 139.1 that is pushed against the desiccant 300 by a first preload spring 138.1. In the second chamber 240, there is arranged a second retention plate 139.2 that is pushed against the desiccant 300 by a second preload spring 138.2. Thus, both the desiccant 300 situated in the first chamber 230 and that situated in the second chamber 240 are held under preload. To ensure that flow can pass through, the retention plate 139, 139.1, 139.2 is preferably equipped with holes, in particular bores.

According to the concept of the disclosure, the air dryer housing 104 has a ventilation valve unit 120 that is arranged within the desiccant container 110, specifically within the second chamber 240. In relation to the first chamber 230, the second chamber 240 has a smaller quantity, in particular an approximately halved quantity, of desiccant 300, because a part of the space of the second chamber 240 is required to accommodate the ventilation valve unit 120.

The ventilation valve unit 120 has a valve element 122 that is integrally connected to the port device 140. The valve element 122 and the port device 140 are thus formed as an integral component, in particular as a plastics injection-molded component. The valve element 122 has a substantially cylindrical outer surface 123 such that the valve element 122 can be received entirely within the desiccant container 110 and, at least at one location between the outer surface 123 and the desiccant container 110, a compressed-air flow DL can pass the valve element 122 in the direction of the longitudinal extent LE, specifically between the side of the desiccant 300 and a pneumatic port arranged in the port device 140, in particular a pneumatics port 12 and/or a regeneration port 14. In particular, an approximately hollow cylindrical flow gap 164 is formed between the outer surface 123 and the desiccant container 110. The region between the outer surface 123 and the desiccant container 110, in particular the flow gap 164, may also be used to partially or entirely accommodate at least one assembly clip 160. The ventilation valve unit 120 is configured in the present case as a pneumatic relay valve 121.

The valve element 122 has a valve interior space 125 with at least two hollow cylindrical segments of different diameters arranged adjacent to one another in the direction of the valve axis AV, in the present case a relay segment 142 with a relay diameter DR and, adjoining this in the direction of the port device 140, a switching segment 144 with a switching diameter DS.

A valve piston 124 is received, so as to be axially displaceable in the direction of the valve axis AV, within the container interior space 125. The valve piston 124 is of stepped cylindrical configuration, specifically so as to correspond to the valve interior space 125 with the relay segment 142 and the switching segment 144. Correspondingly, the valve piston 124 has a piston relay segment 146, the outer diameter of which corresponds to the relay diameter DR and is in particular slightly smaller in order to allow an axial movement BA of the valve piston 124. On its radially outer side, the piston relay segment 146 has, in particular, a relay seal 150 that is formed as an encircling sealing ring between the piston relay segment 146 and the relay segment 142.

Figure 1C:
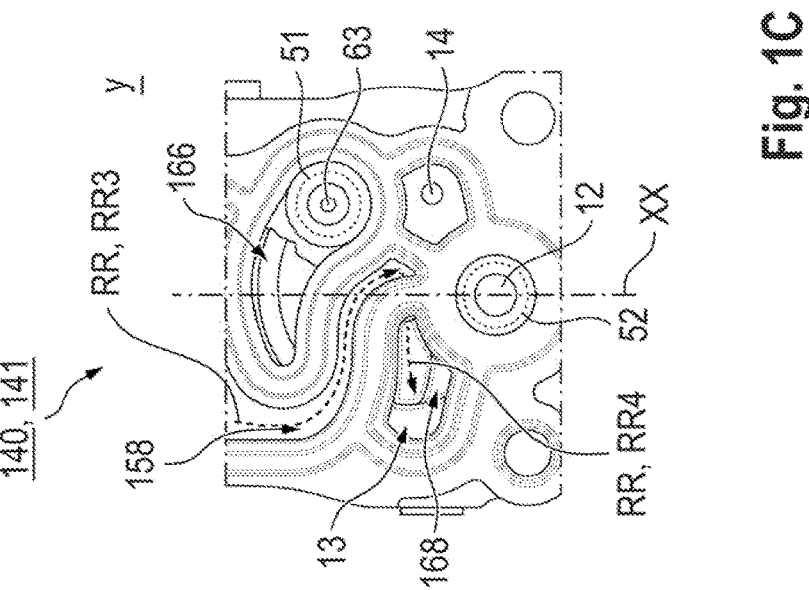
FIG. 1C shows the view of the embodiment of the air dryer arrangement shown in FIG. 1A, but with an illustration of possible flow directions of the compressed-air flow.
Figure 1B:
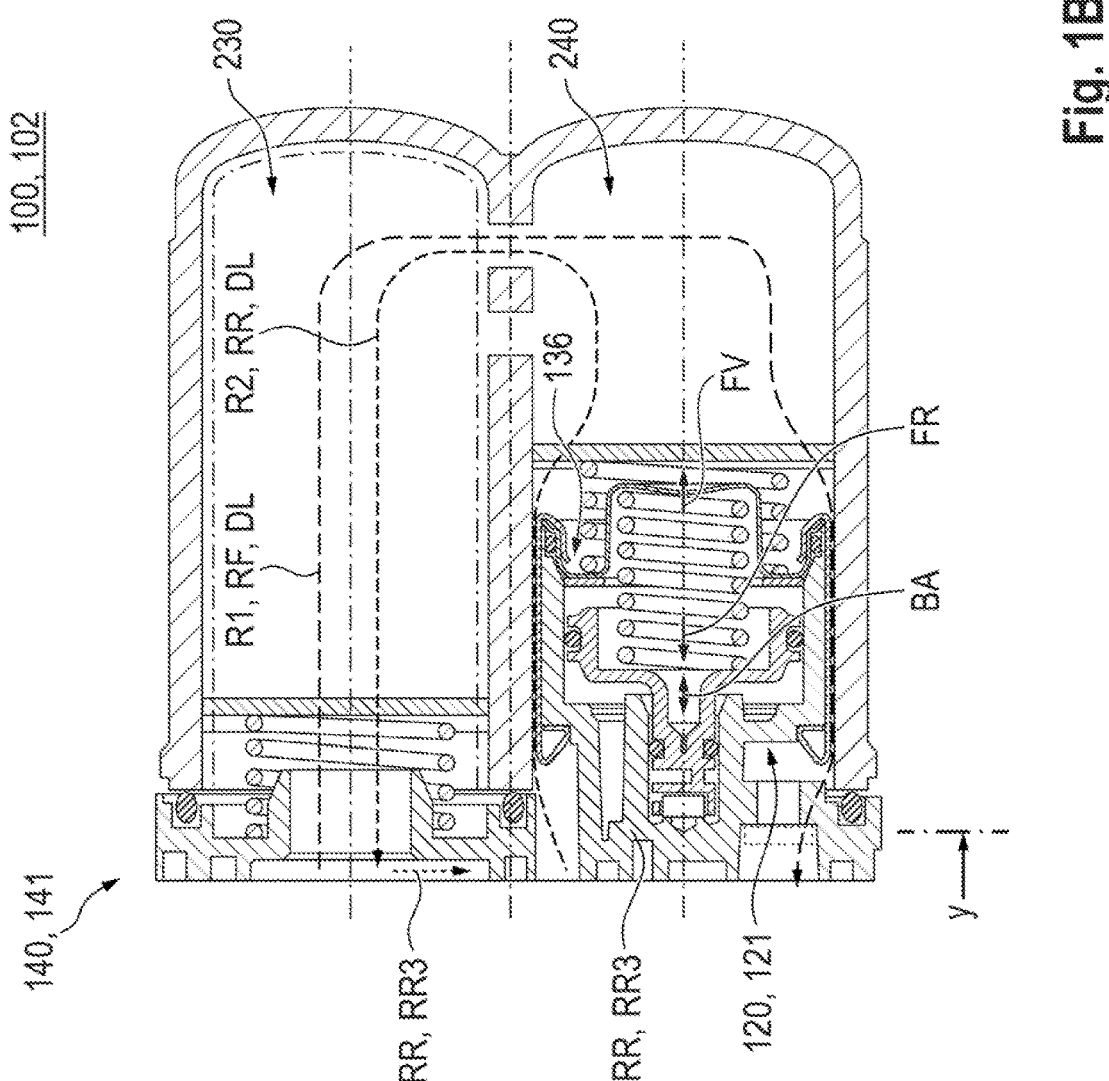
FIG. 1B shows the view of the embodiment of the air dryer arrangement shown in FIG. 1, but with an illustration of possible flow directions of the compressed-air flow.
Figure 1D:
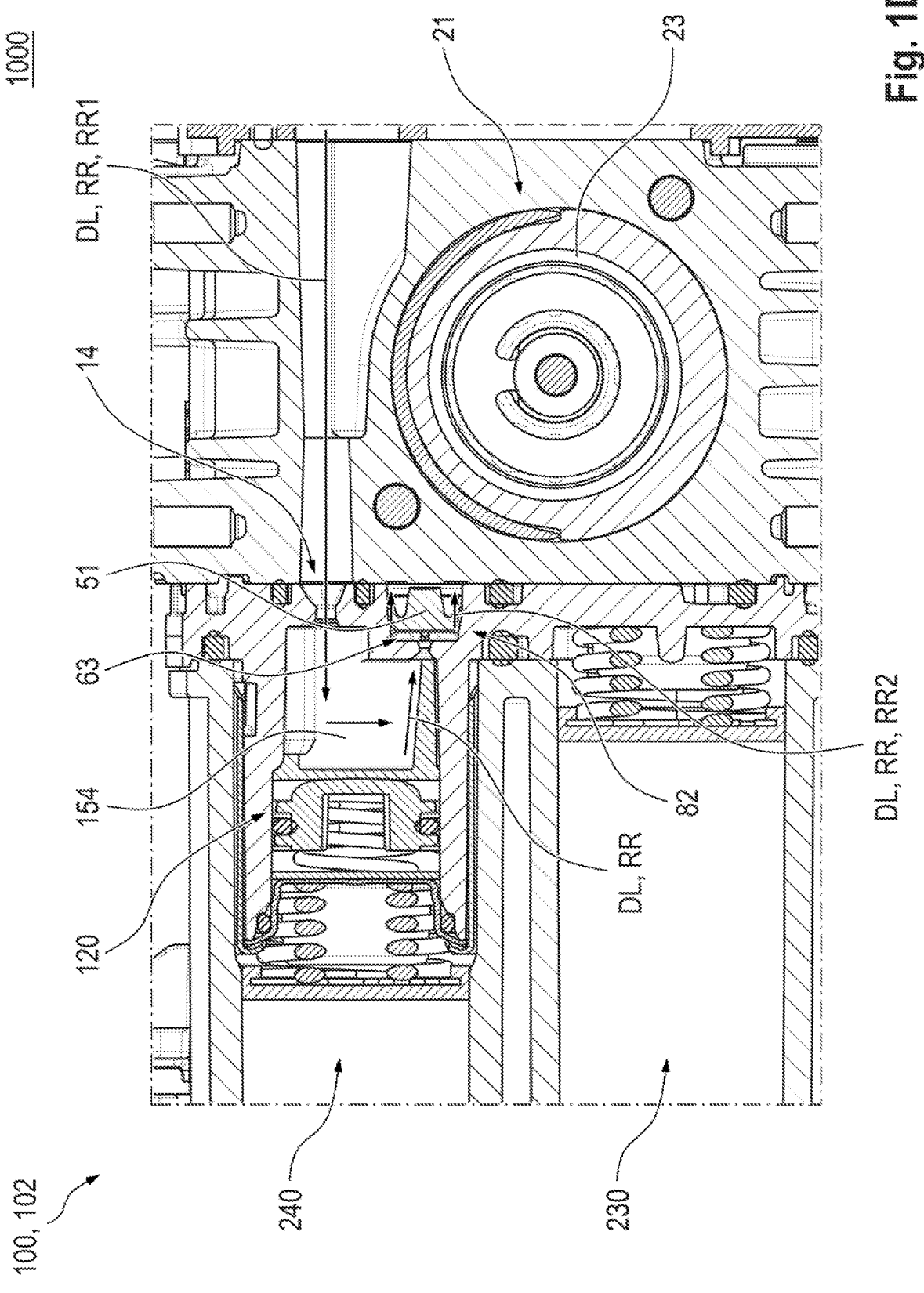
FIG. 1D shows a detail of a cross section through an embodiment of a structural configuration of a compressed-air supply system with an air dryer arrangement shown in FIG. 1, in a region that includes a compressor and a part of the air dryer arrangement.

Owing to the pressure-tight contact between the relay segment 142 and the piston relay segment 146, a relay chamber 154 is formed on that side of the container interior space 125 which faces toward the port device 140, which relay chamber is pneumatically connected to a regeneration port 14 that is arranged on the port device 140 (in this regard, see also FIG. 1D).

The valve piston 124 has a piston switching segment 148 which is arranged in the direction of the port device 140 and the outer diameter of which corresponds to the switching diameter DS and is in particular slightly smaller in order to allow an axial movement BA of the valve piston 124. On its radially outer side, the piston switching segment 148 has, in particular, a switching seal 152 that is formed as an encircling sealing ring between the piston switching segment 148 and the switching segment 144.

Owing to the pressure-tight contact between the switching segment 144 and the piston switching segment 148, a switching chamber 156 is formed in the switching segment 144. On its end side facing toward the port device 140, the piston switching segment 148 has a switching surface AS which, in the delivery position 120A of the ventilation valve unit 120 as illustrated here, bears in pressure-tight fashion against, and closes, a ventilation valve seat 128 that is arranged in the valve element 122. In particular, a damper cushion 170 may be arranged on the switching surface AS, which damper cushion is advantageously formed from a soft material, for example an elastomer, and can serve for advantageously reducing an impulse, and in particular an emission of noise, during an axial movement BA of the valve element 122 back into the delivery position 120A. During an axial movement BA of the valve element 122 away from the port device 140, the switching surface AS lifts off from the ventilation valve seat 128, whereby a compressed-air flow DL can pass through the switching chamber 156, and in particular, a connecting channel 158 which leads to the compressor port 11 is pneumatically connected to the ventilation port 13. The connecting channel 158 is advantageously formed into the port device 140, in particular into the port flange 141.

On its end side of the valve element 122 averted from the port device 140, the ventilation valve unit 120 has a covering diaphragm 130, which is impermeable to air and which is in particular in the form of a housing cover and which, in particular hermetically, closes off the valve interior space 125. The covering diaphragm 130 is formed in particular as a thin-walled, rotationally symmetrical component. In the present case, the covering diaphragm 130 is held in positively locking fashion on the valve element 122 by way of two assembly clips 160. An annular diaphragm seal 132, in particular in the form of a sealing ring, is arranged between the valve element 122 and the covering diaphragm 130.

The ventilation valve unit 120, which has the valve element 122 and assembly clips 160, has in particular a valve element diameter DV which is in particular smaller, preferably slightly smaller, then a desiccant container internal diameter DT of the container interior space 215 of the desiccant container 110, in particular of the first chamber 230 and/or of the second chamber 240. In particular, the valve element diameter DV is smaller than the desiccant container diameter DT such that a resulting flow gap 164 has a cross section that is suitable for a required compressed-air flow DL. In particular, the valve element diameter DV is smaller than the desiccant container diameter DT so as to result in a cross section that corresponds to a nominal width of between 2.4 mm and 4 mm.

On the side facing toward the valve interior space 125, the covering diaphragm 130 has a restoring spring receptacle 134 for receiving a restoring spring 126. The restoring spring 126 is thus held between the restoring spring receptacle 134 and the valve piston 124 and serves for applying a restoring force FR to the axially movable valve element 124. The restoring force FR is in particular dependent on the deflection—resulting from the axial movement BA—of the valve piston 124 and on a restoring spring constant FRK of the restoring spring 126.

On the side averted from the valve interior space 125, the covering diaphragm 130 has a preload spring receptacle 136, in this case a second preload spring receptacle 136.2, for receiving the second preload spring 138.2 of the second chamber 240. The second preload spring 138.2 of the second chamber 240 is thus arranged between the second preload spring receptacle 136.2 and the second retention plate 139.2 in order to apply a preload force FV to the second retention plate 139.2. The second preload spring receptacle 136.2 and the restoring spring receptacle 134 are arranged in radially different zones, whereby they can be arranged so as to axially overlap in an advantageously space-saving manner.

A damping disk 172 may be arranged between the valve piston 124 and the covering diaphragm 130 in order to advantageously dampen the axial movement BA of the valve element 124 with noise-reducing action when it reaches an end position, in particular a regeneration position 120B.

The port device 140, in particular the port flange 141, has a first port connection piece 143.1 and a second port connection piece 143.2, wherein the first port connection piece 143.1 has a compressor port 11 and a first preload spring receptacle 136.1, and the second port connection piece 143.2 is formed by the valve element 122.

The functioning of the air dryer arrangement 100 and in particular of the ventilation valve unit 120 will be described in more detail below, with additional reference to FIG. 1B and FIG. 1C. In the delivery position 120A of the ventilation valve unit 120 that is shown here, a compressed-air flow DL, in particular from a compressor 21 that is not illustrated here, is made available at the compressor port 11, which compressed-air flow passes in a first direction RR1, in this case a delivery direction RF, through the retention plate 139 of the first chamber 230, through the desiccant 300 that is held in the first chamber 230, through the first and second openings 225.1, 225.2, onward through the desiccant 300 that is held in the second chamber 240, through the retention plate 139 of the second chamber 240 and through the flow gap 164 past the valve element 122, to a port chamber 162, which is arranged in the valve element 122 and/or the port device 140 and which at the same time has the pneumatics port 12.

The compressed-air flow DL in the delivery direction RF furthermore leads past a check valve 52, having a check valve element 52.1 that lifts off from a check valve seat 52.2 for this purpose. The check valve 52 ensures that no compressed-air flow DL can pass in the opposite direction from the pneumatics port 12 to the desiccant 300. The compressed-air flow DL that has been dried by the desiccant 300 is made available at the pneumatics port 12, in particular for a pneumatics system 1002 that is not illustrated here.

If compressed air, in particular at a deactivation pressure PA, is now applied to the regeneration port 14, the compressed air acts, in the relay chamber 154 that is pneumatically connected to the regeneration port 14, on a relay surface AR formed by that end side of the piston relay segment 146 which faces toward the port device 140.

If the compressed air prevailing at the regeneration port 14 reaches a high enough air pressure, in particular a deactivation pressure PA, then the restoring force FR acting on the valve piston 124 is overcome, and the valve piston 124 moves in an axial movement BA. This has the result that the switching surface AS lifts off from the ventilation valve seat 128, and the ventilation valve unit 120 is thus situated in a regeneration position 120B.

The lifting of the switching surface AS from the ventilation valve seat 128 has the result that the compressor port 11, which is connected to the connecting channel 158, is pneumatically connected to the ventilation port 13, and a compressed-air flow DL can thus pass in a second direction RR2, in this case a regeneration direction RR, which is opposite to the delivery direction RF, in particular in the region of the desiccant 300. For this purpose, the compressed-air flow DL that is made available at the regeneration port 14 flows—in particular from the relay chamber 154—through a regeneration throttle 63, past a regeneration check valve 51 that is illustrated by dashed lines in FIG. 1A, and via a regeneration passage 166—visible in particular in FIG. 1A and formed in the valve element 122 and/or the port device 140—into the flow gap 164. From there, the compressed-air flow DL passes into the region of the desiccant 300 of the second chamber 240, and onward in the regeneration direction through the openings 225.1, 225.2, and through the desiccant 300 situated in the first chamber 230, to the compressor port 11. From the compressor port 11, and through the connecting channel 158, the compressed-air flow DL can then flow in the regeneration direction RR, past the open ventilation valve seat 128, to the ventilation port 13. The regeneration throttle 63 is formed in particular as a bore in the port device 140, and preferably has a nominal width of between 1.2 mm and 2 mm.

It falls within the scope of the disclosure for a port device to have a different port layout, in particular a different number of pneumatic ports. Such a deviation may arise in particular owing to the dryer circuit that is used. For example, an air dryer housing for a normally-ventilating dryer circuit or dryer arrangement may have a different port layout than an air dryer housing for a fast-ventilating dryer circuit or dryer arrangement.

During delivery operation of the air dryer, in particular when the ventilation valve unit 120 is in its delivery position 120A, the regeneration check valve 51 prevents compressed air of the compressed-air flow DL from being able to escape via the regeneration passage 166 and the regeneration port 14.

The compressed-air flow DL which has been expanded by the regeneration throttle 63 and which flows in the regeneration direction RR can absorb a relatively large amount of moisture in accordance with the pressure swing adsorption principle, and is thus particularly advantageously suitable for drying the desiccant 300. In some embodiments within the scope of the disclosure, a compressed-air flow DL in the regeneration direction RR is also possible without the desiccant 300 being regenerated, for example merely for the purposes of ventilating a pneumatics system 1002.

In embodiments, the regeneration port 14 may be directly pneumatically connected to the pneumatics port 12 such that, if a deactivation pressure PA is reached after a particular delivery duration of a compressor 21 (not illustrated here), a switch is automatically made into the regeneration position 120B. Alternatively or in addition, a regeneration switching valve 72 (see FIG. 3A) may be arranged between the regeneration port 14 and the pneumatics port 12 in order, in particular by way of compressed air that is stored in a pneumatics system and/or a pressure accumulator, to selectively switchably introduce a compressed-air flow DL in the regeneration direction RR for the purposes of regenerating the desiccant 300.

If the air pressure prevailing at the regeneration port 14 falls below a particular value, in particular below a minimum pressure PMIN, then the valve piston 124 is pushed back onto the ventilation valve seat 128 by the restoring force FR, and the ventilation valve unit 120 is situated in its delivery position 120A again.

FIG. 1A illustrates a detail of the port device 140, configured as a port flange 141, in the region of the second chamber in a plan view of a system-side port side 147 of the port device 140. A dashed line approximately indicates the section plane XX of the sectional drawing illustrated in FIG. 1.

FIG. 1D shows a detail of a cross section through a compressed-air supply system 1001 having an embodiment of an air dryer arrangement 100 shown in FIG. 1, in a region that includes a compressor 21 with a cylinder 23 and a part of the air dryer arrangement 100.

Figure 2:
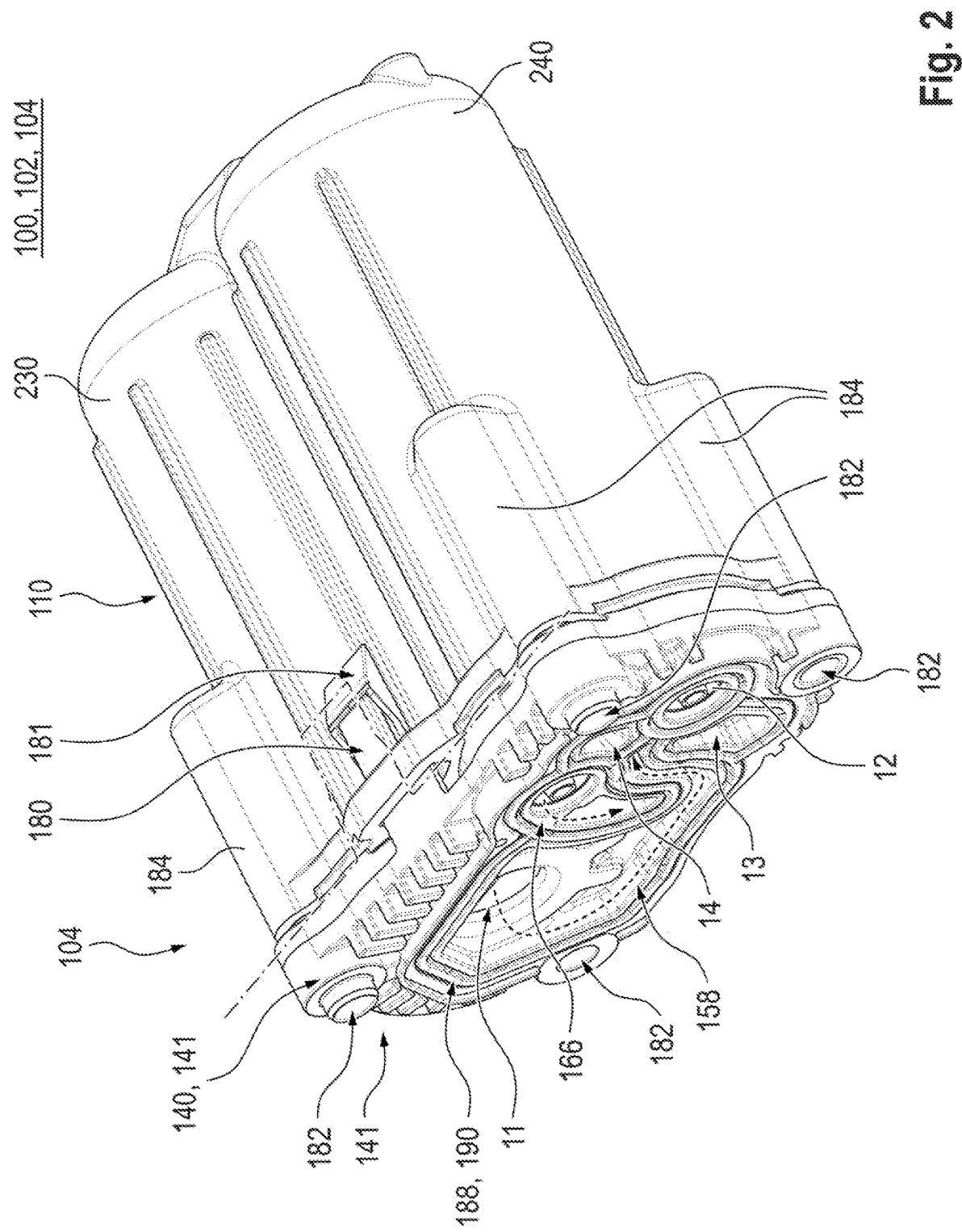
FIG. 2 shows a perspective exterior view of the embodiment of the air dryer arrangement shown in FIG. 1.

FIG. 2 shows the embodiment of an air dryer arrangement 100 illustrated in FIG. 1, in a perspective exterior view. The air dryer arrangement 100 is illustrated here in an assembled state in which the desiccant container 110 has been assembled with the port device 140.

In particular, the port device 140 may have one or more elastic snap hooks 180 which can latch into detent formations 181, formed correspondingly with respect thereto on the desiccant container 110, in order to connect the port device 140 permanently but detachably to the desiccant container 110.

Figure 6:
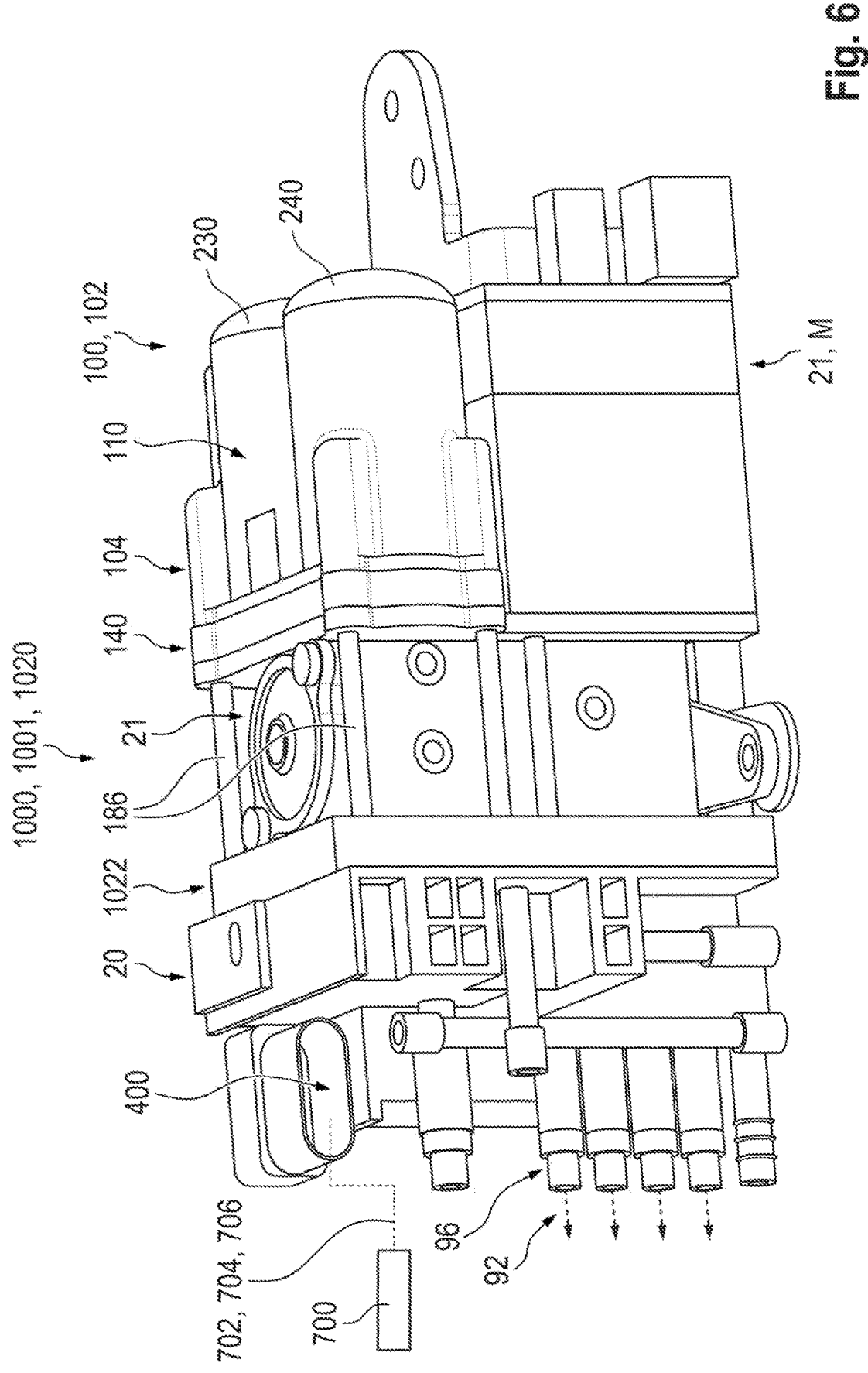
FIG. 6 shows a perspective exterior view of an embodiment of a compressed-air supply system having a embodiment of an air dryer arrangement shown in FIG. 1, wherein the compressed-air supply system may be selectively implemented in accordance with one of the structural forms of FIG. 3A, FIG. 3B or FIG. 3C; and, FIG. 7 is a schematic illustration of a vehicle equipped with an embodiment of a compressed-air supply system that has an embodiment of an air dryer arrangement according to FIG. 1.

Alternatively or in addition, the port device 140 may have assembly bores 182, and the desiccant container 110 may have screw receptacles 184 arranged correspondingly thereto, for the purposes of connecting the port device 140 to the desiccant container 110 using assembly screws 186. In the present case, the port device 140 has four assembly bores 182, and the desiccant container 110 correspondingly has four screw receptacles 184. One or more assembly screws 186 may, as shown in FIG. 6, be configured to connect further assemblies, in particular a compressed-air supply system 1001, to the air dryer arrangement 100.

In the view illustrated in FIG. 2, an outwardly directed port side 147 of the port device 140 is visible, which port side is configured in particular for being assembled together with a compressor 21 (not illustrated) and/or with a compressed-air supply system 1001.

The port device 140 and the valve element 122 (not visible here) are formed as an integral component, which is in particular produced as a single piece in an injection molding process. In particular, all pneumatic ports, in particular the compressor port 11, the pneumatics port 12, the ventilation port 13 and the regeneration port 14, are formed as recesses in the port device 140. A recess is to be understood to mean a configuration feature generated by removal of material, in particular a hole and/or a bore and/or a channel.

Furthermore, the port device 140 may, on its port side 147, have one or more seal receptacles 188 for receiving one or more port seals 190. When the air dryer arrangement 100 has been mounted onto a further component, in particular a compressor 21 and/or a compressed-air supply system 1001, a port seal 190 bears sealingly against the component and is in particular configured to sealingly separate one pneumatic port 11, 12, 13, 14, connecting channel 158 or passage 166, 168 from a further pneumatic port 11, 12, 13, 14, connecting channel 158 or passage 166, 168.

Figure 2A:
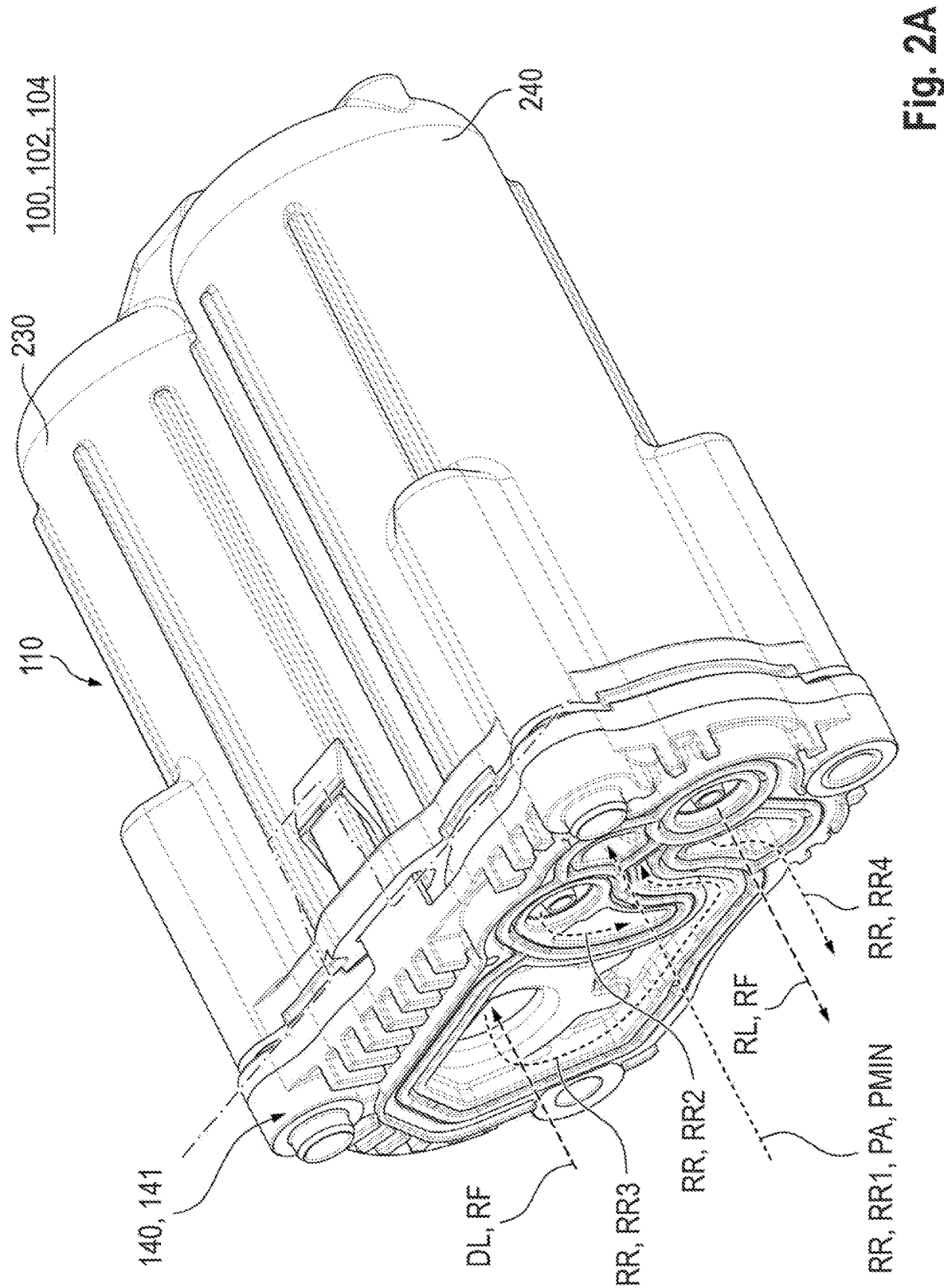
FIG. 2A shows the view of the embodiment of the air dryer arrangement shown in FIG. 2, but with an illustration of possible flow directions of the compressed-air flow.

FIG. 2A illustrates the flow directions both in the delivery position 120A and in the regeneration position 120B of the ventilation valve unit 120, and in this respect reference is additionally made to FIG. 2 with regard to the structural features.

A compressed-air flow DL from a compressor 21 can be made available at the compressor port 11, which is arranged on the port device 140 in the region of the first chamber 230, and the compressed-air flow can pass into the first chamber 230 in a delivery direction RF. After flowing through the air dryer arrangement 100, which has already been described in conjunction with FIG. 1, the compressed-air flow DL passing in the delivery direction RF emerges at the pneumatics port 12, and is made available there in particular for a pneumatics system 1002.

If a compressed-air quantity or a compressed-air flow DL is made available at the regeneration port 14, which is arranged in the region of the second chamber 240 in the vicinity of the ventilation valve unit 120 (not visible here), at an air pressure, in particular a deactivation pressure PA, which is high enough to move the valve piston 124, then the ventilation valve unit 120 is switched into the regeneration position 120B. The compressed-air flow DL prevailing at the regeneration port 14 can then flow in a regeneration direction RR via a first regeneration flow portion RR1 through the relay chamber 154, the regeneration throttle 63 and the regeneration check valve 51 (in this regard, see also FIG. 1B), and onward through the regeneration passage 166 in a second regeneration flow portion RR2, into the second chamber 240 past the valve element 122, in particular through the flow gap 164. From there, the compressed-air flow DL can flow in the regeneration direction RR—as illustrated in FIG. 1— through the desiccant 300, with regenerating action, to the compressor port 11. After emerging at the compressor port 11, the compressed-air flow DL passes, in a third regeneration flow portion RR3 that is illustrated here, to the switching chamber 156 (not visible here), and past the open ventilation valve seat 128 to the ventilation port 13. From the ventilation port 13, the compressed-air flow DL passes via a ventilation passage 168 in a fourth regeneration flow portion RR4 into a vent (not illustrated in any more detail here), in particular into the surroundings, that is, into a region surrounding an air dryer arrangement and/or a compressed-air supply system and/or a vehicle.

The connecting channel 158, the regeneration passage 166 and/or the ventilation passage 168 are particularly advantageously formed as recesses in the port device 140.

Figure 2B:
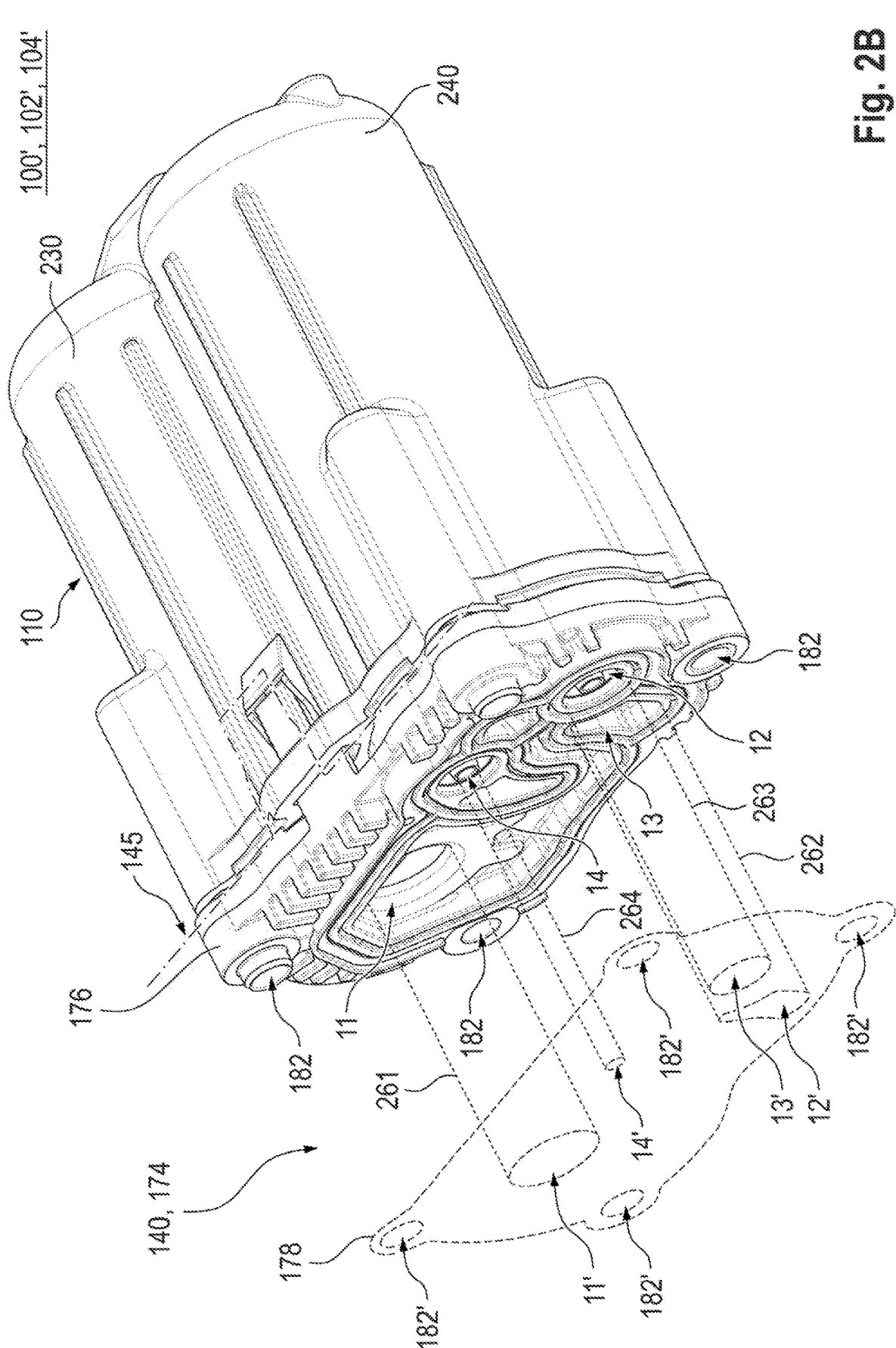
FIG. 2B shows a second advantageous embodiment of a further air dryer housing having a port device that is configured as a port assembly.

FIG. 2B shows a second advantageous embodiment of a further air dryer housing 104' having a schematically illustrated port device 140 that is configured as a port assembly 174. The port assembly 174 has a dryer flange 176 which may preferably, at least on the desiccant-side container side 145, be configured identically to a port flange 141 for the purposes of pressure-tight closure of the desiccant container 110. The port assembly 174 furthermore has a compressor flange 178 which is schematically illustrated here by dashed lines and which may preferably, at least on the system-side port side 147, be configured identically to a port flange 141 for the purposes of mechanical and/or pneumatic connection of the air dryer housing 104' to a compressed-air supply 1000, in particular a compressed-air supply system 1001 and/or a compressed-air supply module 1020. The port assembly 174 has at least one pneumatic port 11, 12, 13, 14 in the dryer flange 176, in the present case a compressor port 11, a pneumatics port 12, a ventilation port 13 and a regeneration port 14, with each pneumatic port 11, 12, 13, 14 being assigned a corresponding pneumatic remote port 11', 12', 13', 14' in the compressor flange 178. Each pneumatic port 11, 12, 13, 14 is pneumatically connected via a connecting line 261, 262, 263, 264 to the corresponding pneumatic remote port 11', 12', 13', 14'. In the present case, the compressor port 11 is pneumatically connected via a first connecting line 261 to a remote compressor port 11'. The pneumatics port 12 is pneumatically connected via a connecting line 262 to a remote pneumatics port 12'. The ventilation port 13 is pneumatically connected via a third connecting line 263 to a remote ventilation port 13'. The regeneration port 14 is pneumatically connected via a fourth connecting line 264 to a remote regeneration port 14'. A connecting line 261, 262, 263, 264 may be configured in particular as a rigid pipeline or as a flexible line, in particular a hose. Thus, either the dryer flange 176 may be configured as a component which is separate from the compressor flange 178, or the dryer flange 176 is connected directly and mechanically to the compressor flange 178, such that there is not only a pneumatic connection but also a mechanical connection between the dryer flange 176 and the compressor flange 178. In this second case, the air dryer housing 104' and the compressed-air supply 1000 would then also be mechanically connected to one another. Otherwise, in the former case, there would only be a pneumatic connection, and no mechanical connection, between the dryer flange 176 and the compressor flange 178.

Figure 3A:
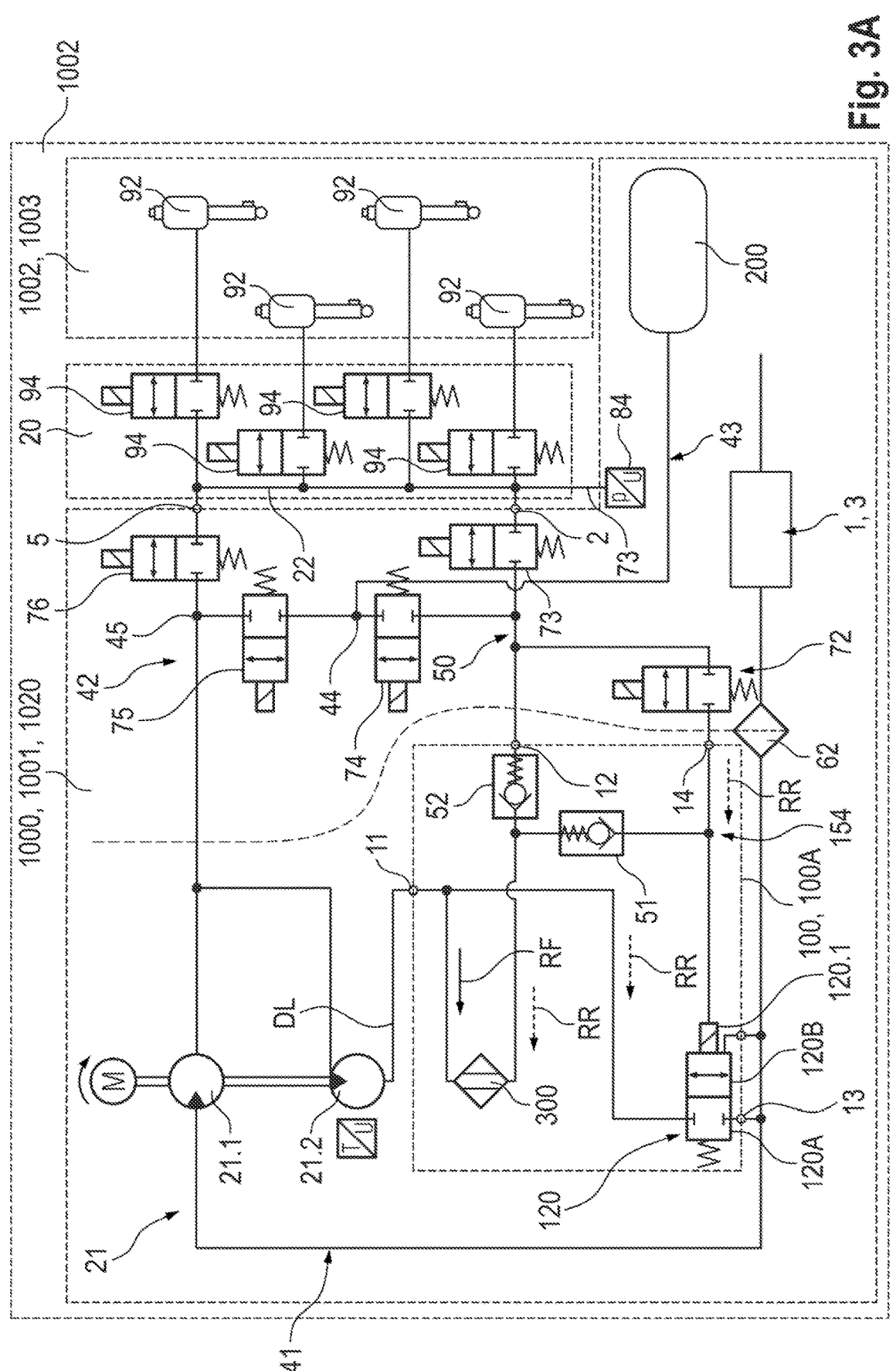
FIG. 3A shows a pneumatic circuit diagram of a first embodiment of a compressed-air supply system having an air dryer arrangement according to the embodiment discussed above in FIG. 1 to FIG. 1C and FIG. 2.

FIG. 3A shows a pneumatic circuit diagram of a pneumatic system 1010, including an embodiment of a compressed-air supply 1000 in the form of a compressed-air supply system 1001, for providing a supply to a pneumatics system 1002 in the form of an air spring system 1003. The compressed-air supply system 1001 may be configured in particular as a compressed-air supply unit 1020 which is of modular construction but which, when assembled, forms a structural unit, in particular as illustrated in FIG. 6.

Via an air feed 1, which may simultaneously also be a vent 3, air is drawn in through an air filter 62 and a feed line 41 by a compressor 21. In the present case, the compressor 21 is configured as a two-stage compressor having a first compressor stage 21.1 and a second compressor stage 21.2, and is driven by an electric motor M. Other forms of compressor, in particular a single-stage compressor, may nevertheless also be provided within the scope of the disclosure.

The compressed-air flow DL that is compressed by the compressor 21 is made available to the air dryer arrangement 100 at a compressor port 11. From there, if the ventilation valve unit 120 is situated in its delivery position 120A, the compressed-air flow DL flows in the delivery direction RF through the desiccant 300, past the check valve 52, to the pneumatics port 12, at which it is made available to a pneumatics main line 50. From there, the compressed-airflow DL may be made available, in particular in a selectively switchable manner via a pneumatics main valve 73, at a compressed-air port 2 of the compressed-air supply system 1001 for the pneumatics system 1002. A regeneration check valve 51 prevents the compressed-air flow DL in the delivery direction RF from escaping in the direction of the regeneration port 14.

In the present case, a valve block 20 having four bellows valves 94 is connected to the compressed-air port 2. Via a bellows valve 94, a pneumatic supply can be provided to in each case one air spring 92 of the air spring system 1003. The valve block 20 may preferably be configured as part of the compressed-air supply system 1001.

The compressed-air supply system 1001 furthermore has a pressure accumulator 200, which can be selectively connected to the pneumatics main line 50 via an accumulator valve 74 arranged in the accumulator branch 43 that leads away from the pneumatics main line 50. The accumulator valve 74 is arranged between the pneumatics main line 50 and an accumulator junction 44 that is arranged in the accumulator branch 43.

The compressed-air supply system 1001 may optionally have a return flow port 5 via which a compressed-air flow returning from the pneumatics system 1002, in particular from the air springs 92, can be taken in again and advantageously utilized as compressed or precompressed air. For this purpose, the compressed-air supply system 1001 may, between the return flow port 5 and the compressor 21, in particular an inlet of the second compressor stage 21.2, have a return flow line 42 via which the returning compressed-air flow that has been taken in again can be fed to the second compressor stage 21.2 for recompression. A return flow valve 76 may be arranged in the return flow line 42 in order to selectively open and shut off the return flow line 42. Proceeding from a branch junction 45 arranged in the return flow line 42, a boost line 46 may be connected to the accumulator junction 44. A boost valve 75 is advantageously arranged in the boost line 46.

When the pneumatics main valve 73 is closed and at the same time the accumulator valve 74 is open, the pressure accumulator 200 can be filled by way of the compressed-air flow DL that is made available at the pneumatics port 12, and the content of the pressure accumulator 200 can be stored by subsequently closing the accumulator valve 74.

When the accumulator valve 74 is closed and the boost valve 75 is open, and at the same time the return flow valve 76 is closed, compressed air stored in the pressure accumulator 200 can be made available to the compressor 21, in particular to the second compressor stage 21.2.

A regeneration of the air dryer arrangement 100 can be performed when required, in particular when a deactivation pressure PA is reached. The deactivation pressure PA may be measured for example via a pressure sensor 84 arranged in a gallery 22 of the pneumatics system 1002.

By virtue of the regeneration switching valve 72 being opened, a compressed-air flow DL—originating from the pressure accumulator 200 and/or one or more air springs 92 and made available via the pneumatics main line 50—can be made available at the regeneration port 14. From the regeneration port 14, the compressed-air flow DL or a proportion of the compressed-air flow DL passes in a regeneration direction RR to a control port 120.3 of the ventilation valve unit 120, which is formed in particular by the relay chamber 154 shown in FIG. 1 and by the relay surface AR. The application of an adequately high air pressure, in particular a deactivation pressure PA, to the relay surface AR causes the ventilation valve unit 120 to switch into the regeneration position 120B.

Via a branching point 82 that leads away from the relay chamber 154, the compressed-air flow DL passes in the regeneration direction RR via the regeneration throttle 63 and the regeneration check valve 51 to the desiccant 300, where the compressed-air flow DL that has been expanded by the regeneration throttle 63 draws moisture out of the desiccant 300 and transports the moisture via the open ventilation valve unit 120—in particular the switching chamber 156 thereof—to the ventilation port 13. From the ventilation port 13, the moisture-laden compressed-air flow DL passes to the vent 3, in particular the surroundings.

The bellows valves 94, the regeneration switching valve 72, the accumulator valve 74, the boost valve 75 and the return flow valve 76 are configured here as 2/2 directional solenoid valves and are actuatable, via electrical control lines (not illustrated here), by a control unit 700 (likewise not illustrated here).

Figure 3B:
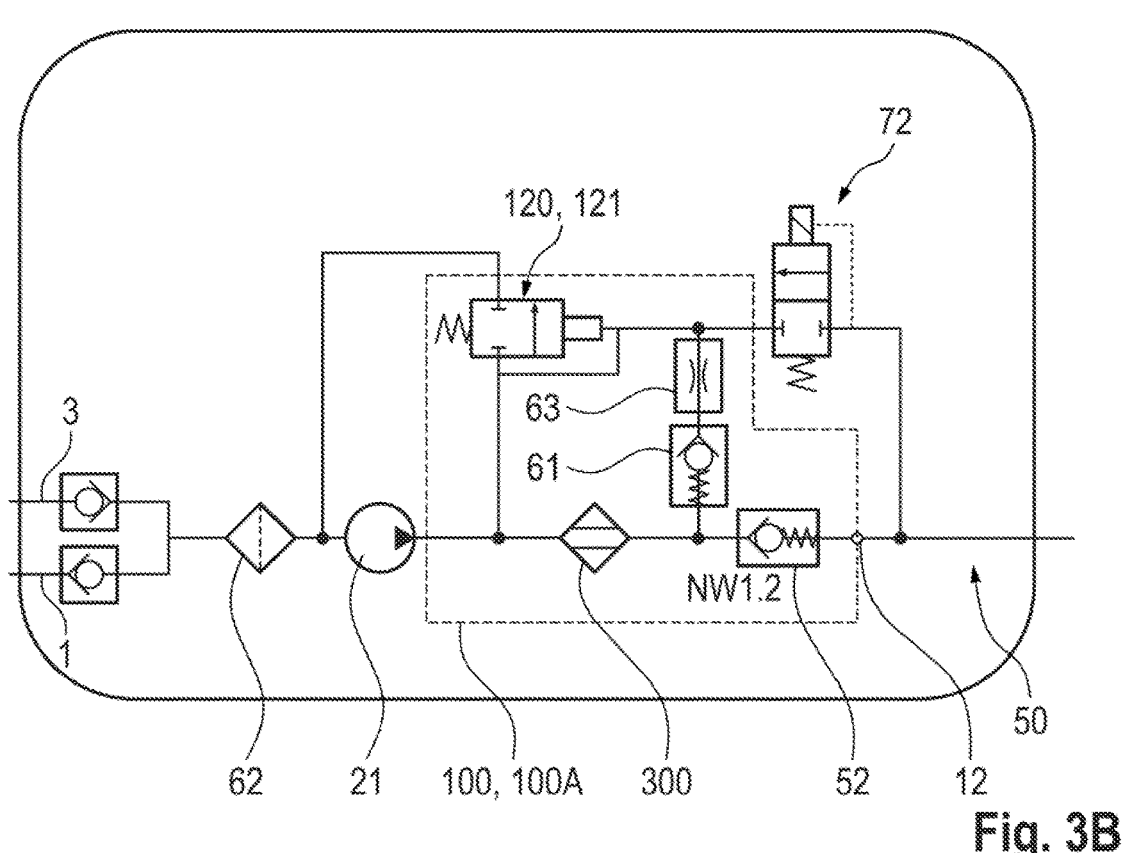
FIG. 3B, FIG. 3C schematically show, by way of example, different embodiments of compressed-air supply systems having an air dryer arrangement according to the embodiment discussed above in FIG. 1 to FIG. 1C and FIG. 2, wherein the structural form of the compressed-air supply system of FIG. 3B is substantially a normally-ventilating compressed-air supply system as in FIG. 3A, and the structural form of the compressed-air supply system of FIG. 3C is substantially a fast-ventilating compressed-air supply system.
Figure 3C:
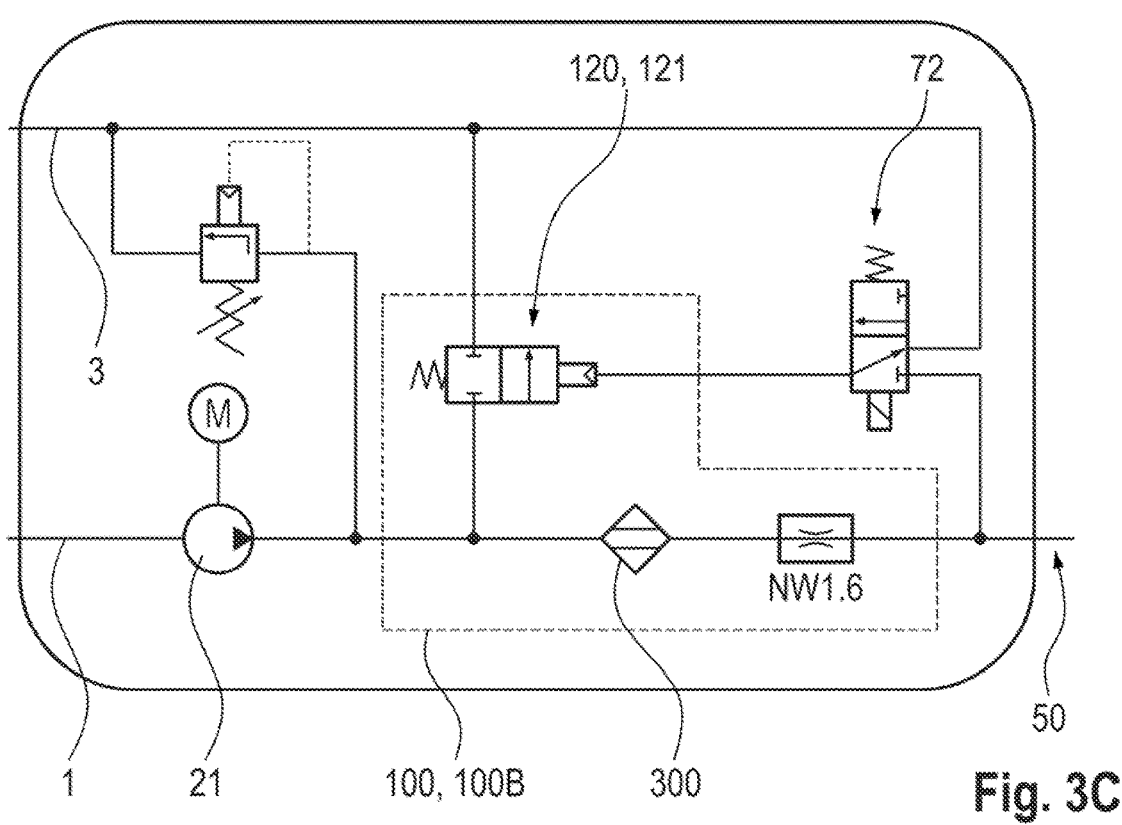

The present air dryer arrangement 100 is configured as a normally-ventilating air dryer arrangement 100A. Different structural forms or configurations of the air dryer arrangement 100 are nevertheless possible within the scope of the disclosure. FIG. 3B and FIG. 3C schematically show such structural forms by way of example.

FIG. 3B likewise shows a normally ventilating air dryer arrangement 100A in a schematically illustrated compressed-air supply system 1001. In this respect, reference is made to the statements given with regard to FIG. 3A. FIG. 3C shows a further air dryer arrangement 100 according to the concept of the disclosure in the form of a fast-ventilating air dryer arrangement 100B.

The concept of the disclosure can be implemented independently of the dryer circuit or the type of air dryer arrangement 100A, 100B. In particular, the concept of a port device 140 having a valve element 122, which at a desiccant side projects into the desiccant container 110, of a pneumatic relay valve 121 for forming a ventilation valve unit 120 having a valve piston 124 can be implemented independently of the type of air dryer arrangement 100A, 100B. This is in particular independent of a number of pneumatic ports 11, 12, 13, 14 or connecting channels 158 or regeneration passages 166 or ventilation passages 168 or similar ports or channels.

Figure 4:
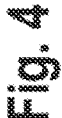
FIG. 4 shows a three-dimensional exploded illustration of the embodiment of an air dryer arrangement shown in FIG. 1.

FIG. 4 is an exploded illustration of the individual components of the air dryer housing 104 according to the concept of the disclosure of the air dryer arrangement 100 that has already been illustrated in FIG. 1 and FIG. 2.

The ease of assembly of the air dryer arrangement 100 and in particular of the ventilation valve unit 120 can be clearly seen from this view. In particular, to assemble the ventilation valve unit 120, the components thereof are merely introduced in the correct axial sequence into the valve element 122 and are subsequently fastened via one or more assembly clips 160. In particular, for this purpose, each assembly clip 160 has an elastically flexible detent lug 160.1 that can be received in a corresponding clip receptacle 122.1 of the valve element 122. On the opposite side of the assembly clip 160 in the direction of the longitudinal extent LE, the assembly clip 160 preferably has a retaining hook 160.2 that is configured to engage with retaining action around the covering diaphragm 130, when the latter has been mounted onto the valve element 122, in particular before the detent lug 160.1 is latched into the clip receptacle 142.1 and the components of the ventilation valve unit 120 have thus been fixedly but detachably assembled. For example, the ventilation valve unit 120 can be particularly easily and reliably assembled with a total of two assembly clips 160.

Figure 5:
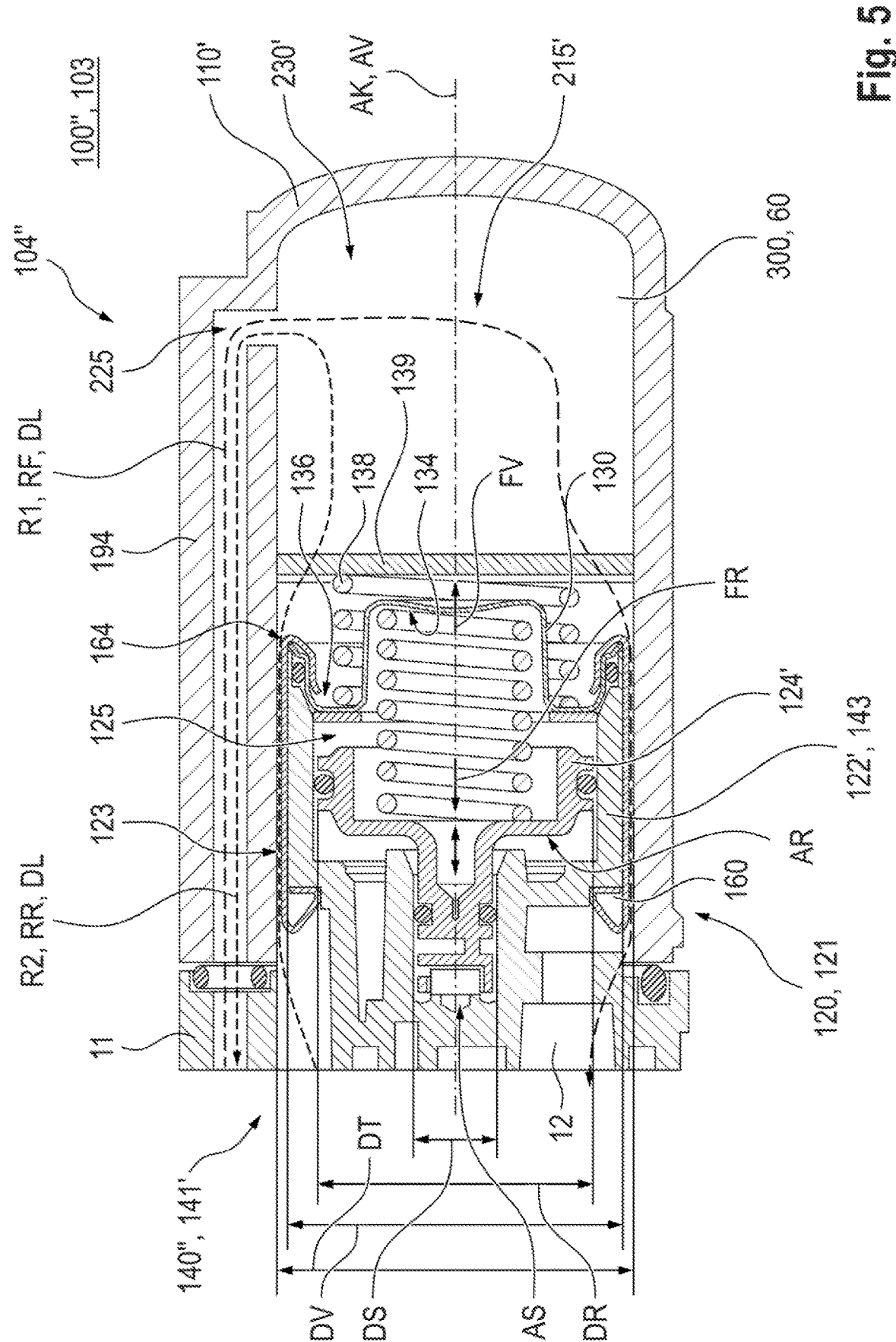
FIG. 5 shows an air dryer arrangement having a single-chamber air dryer, including an air dryer housing according to a third embodiment corresponding to the concept of the disclosure.

FIG. 5 shows a yet further air dryer arrangement 100″ having a single-chamber air dryer 103, including a yet further air dryer housing 104″ according to a third embodiment corresponding to the concept of the disclosure, having a further desiccant container 110′ that includes a further container interior space 215′ for forming a further first chamber 230′. In this embodiment, the further first chamber 230′ forms the only chamber of the air dryer housing 104″.

The yet further air dryer arrangement 100″ has a yet further port device 140″ that is configured in the form of a further port flange 141′. The further port flange 141′ has only one port connection piece 143, which includes a further valve element 122′. Together with a further valve piston 124′, the further valve element 122′ forms a further ventilation valve arrangement 120′. The functioning of the ventilation valve arrangement 120′ is identical to that of the ventilation valve arrangement 120 described in detail in conjunction with the first embodiment. The yet further air dryer housing 104″ has a schematically illustrated chamber connection line 194 that pneumatically connects the opening 225 to the compressor port 11. In other embodiments, the chamber connection line 194 may be formed differently, for example as an annular space extending concentrically around the chamber axis AK outside the further desiccant container 110′. The advantages of the concept of the disclosure may be implemented equally in a single-chamber air dryer 103 as in a double-chamber air dryer 102.

FIG. 6 shows a compressed-air supply system 1001 in the form of a compressed-air supply unit 1020 that has an air dryer housing 104 according to the concept of the disclosure for an air dryer arrangement 100 in the form of a double-chamber air dryer 102.

The desiccant container 110 of the air dryer arrangement 100 has been assembled together with the port device 140 and fastened via assembly screws 186 to a support structure 1022 that includes the compressor 21. The compressor is configured in particular as a reciprocating-piston compressor and is driven via an electric motor M. Likewise fastened to the support structure 1022 is a valve block 20 that is formed via bellows valves 94 (not visible here) in order, via bellows ports 96, to selectively make compressed air available for individual air springs 92 (not illustrated here).

The compressed-air supply system 1001 advantageously has a control connection 400 via which the compressed-air supply system 1001 can be connected, for transmission of signals and/or power, via a control line 702 to an ECU or a control unit 700. In particular, the bellows valves 94, the regeneration switching valve 72, the accumulator valve 74, the boost valve 75 and/or the return flow valve 76, which are each advantageously configured as solenoid valves, can be controlled via the control connection 400. The motor M of the compressor 21 can preferably also be actuated via the control connection 400. The control line 702 is configured in particular as a vehicle bus line 704, particularly preferably as a CAN bus line 706.

Figure 7:
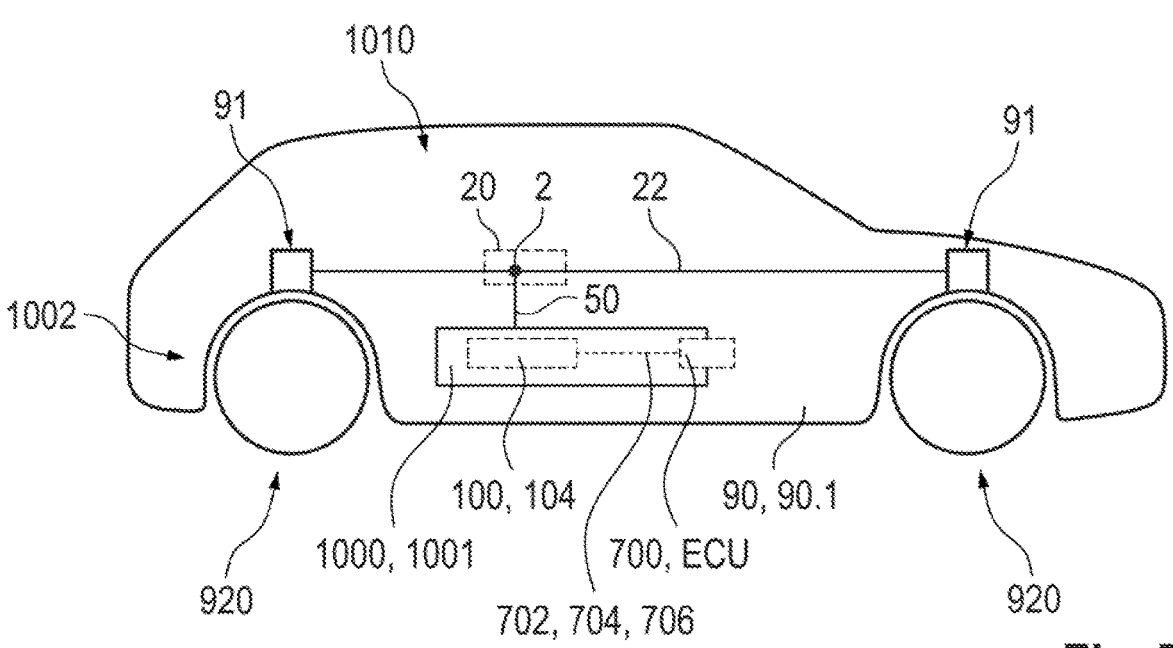

FIG. 7 is a schematic illustration of a vehicle 1200—in the present case in the form of a passenger motor vehicle 1201—including a pneumatic system 1010 having a compressed-air supply system 1001 and having a pneumatics system 1002 configured as an air spring system 1003. The passenger motor vehicle 1200 that is illustrated here by way of example, without limiting applicability to heavy goods vehicles or other utility vehicles, has four wheels 920, of which the two wheels assigned to one side of the vehicle are shown here owing to the sectional illustration. Analogously to the number of wheels, the air spring system 1003 has four air springs 92, of which, analogously to the wheels 920, the two air springs 92 assigned to one side of the vehicle are shown here owing to the sectional illustration. The four air springs 92, which are respectively assigned to the four wheels 920, are, as part of the air spring system 1003, supplied with compressed air by the compressed-air supply system 1001. The compressed-air supply system 1001 has an air dryer arrangement 100 having an air dryer housing 104 according to the concept of the disclosure, and is pneumatically connected to the components of the pneumatics system 90, in this case the four air springs 92, via a pneumatic main line 50 (not shown in any more detail here), a compressed-air port 2, a valve block 20 and a gallery 22. The compressed-air supply system 1001 and/or the vehicle 1200 furthermore has a control unit 700 in the form of an electronic control unit (ECU) that is configured to actuate the components present in the compressed-air supply system 1001. The control unit 700 may likewise actuate further components of the pneumatic system 1010, in particular valves of the valve block 20.

It is understood that the foregoing description is that of the preferred embodiments of the invention and that various changes and modifications may be made thereto without departing from the spirit and scope of the invention as defined in the appended claims.

LIST OF REFERENCE DESIGNATIONS (PART OF THE DESCRIPTION)

1 Air feed
2 Compressed-air port
3 Vent
5 Return flow port
11 Compressor port
12 Pneumatics port
13 Ventilation port
14 Regeneration port
11′ Remote compressor port
12′ Remote pneumatics port
13′ Remote ventilation port
14′ Remote regeneration port
20 Valve block
21 Compressor
22 Gallery
23 Cylinder of the compressor
41 Feed line
42 Return flow line
43 Accumulator branch
44 Accumulator junction
45 Branch junction
50 Pneumatics main line
51 Regeneration check valve
52 Check valve
52.1 Check valve element
52.2 Check valve seat
62 Air filter
63 Regeneration throttle
72 Regeneration switching valve
73 Pneumatics main valve
74 Accumulator valve 75 Boost valve
76 Return flow valve
82 Branching point
84 Pressure sensor
92 Air spring
94 Bellows valve
96 Bellows port
100 Air dryer arrangement
100A Normally-ventilating air dryer arrangement
100B Fast-ventilating air dryer arrangement
102 Double chamber air dryer
103 Single chamber air dryer
104 Air dryer housing
110 Desiccant container
120 Ventilation valve unit
121 Relay valve, pneumatic relay valve
120A Delivery position of the ventilation valve unit
120B Regeneration position of the ventilation valve unit
122 Valve element/valve body
122.1 Clip receptacle of the valve element
123 Outer surface of the valve element
124 Valve piston
125 Valve interior space
126 Restoring spring
128 Ventilation valve seat of the valve element
130 Covering diaphragm
132 Diaphragm seal
134 Restoring spring receptacle
136 Preload spring receptacle
136.1, 136.2 First, second preload spring receptacle
138 Preload spring
138.1, 138.2 First, second preload spring
139 Retention plate
139.1, 139.2 First, second retention plate
140 Port device
141 Port flange
142 Relay segment
143 Port connection piece
143.1, 143.2 First, second port connection piece
144 Switching segment
145 Desiccant-side container side of the port device
146 Piston relay segment
147 Port side of the port device
148 Piston switching segment
149 Port flange segment
150 Relay seal
152 Switching seal
154 Relay chamber
156 Switching chamber
158 Connecting channel
160 Assembly clip
160.1 Detent lug of the assembly clip
160.2 Retaining hook of the assembly clip
162 Port chamber
164 Flow gap
166 Regeneration passage
168 Ventilation passage
170 Damping cushion
172 Damping disk
174 Port assembly
176 Dryer flange
178 Compressor flange
180 Snap hook
181 Detent formation
182 Assembly bore
184 Screw receptacle
186 Assembly screw 188 Seal receptacle
190 Port seal
192 Housing seal
194 Chamber connection line
200 Pressure accumulator
215 Container interior space
220 Web
225 Opening in the web
225.1, 225.2 First, second opening in the web
230 First chamber
240 Second chamber
261 First connecting line
262 Second connecting line
263 Third connecting line
264 Fourth connecting line
300 Desiccant
400 Control connection
700 Control unit/ECU
702 Control line
704 Vehicle bus line
706 CAN bus line
920 Wheel
1000 Compressed-air supply
1001 Compressed-air supply system
1002 Pneumatics system
1003 Air spring system
1010 Pneumatic system
1020 Compressed-air supply unit
1022 Supporting structure of the compressed-air supply unit
1200 Vehicle
1201 Passenger motor vehicle
AK1, AK2 First, second chamber axis
AR Relay surface of the valve piston
AS Switching surface of the valve piston
AV Valve axis
BA Axial movement
DL Compressed-air flow
DR Relay diameter
DS Switching diameter
DT Desiccant container internal diameter
DV Valve element diameter
FR Restoring force
FRK Restoring spring constant
FV Preload force
LE Longitudinal extent of the desiccant container
M Motor
PA Deactivation pressure
PMIN Minimum pressure
RF Delivery direction
RR Regeneration direction
RR1-4 First to fourth regeneration flow portion
XX Section plane

The invention claimed is:

1. An air dryer housing comprising:
a desiccant container having a chamber fillable with desiccant and having a desiccant side;
a port device configured to connect said air dryer housing to a compressed-air supply providing a compressed-air flow;
said port device being connectable in a pressure-tight manner to said desiccant container on said desiccant side thereof;
said port device having, at said desiccant side, a valve body projecting into said chamber of said desiccant container;
a valve piston movable in said valve body;

said valve body and said valve piston conjointly defining a ventilation valve unit configured as a pneumatic relay valve;

said port device having a system-side port side and said port device being connectable to a compressed-air supply system; and, said valve piston being movable between a first position wherein said compressed-air flow passes through said desiccant container in a first direction and a second position wherein said compressed-air flow passes through said desiccant container in a second direction.

2. The air dryer housing of claim 1, wherein at least one of the following applies:

i) said port device integrally forms said valve body;

ii) said ventilation valve unit projects entirely into said desiccant container;

and, iii) said ventilation valve unit is arranged entirely within said desiccant container.

3. The air dryer housing of claim 1, wherein said air dryer housing is configured for a double-chamber air dryer; and, said desiccant container defines a container interior space partitioned into a first chamber and a second chamber.

4. The air dryer housing of claim 3, further comprising a web extending along a longitudinal extent of said desiccant container wherein said first chamber and said second chamber are pneumatically connected via at least one opening in said web.

5. The air dryer housing of claim 3, wherein said port device has a first port connection piece and a second port connection piece; said first port connection piece has a first preload spring receptacle; and, said second port connection piece is formed by said valve body.

6. The air dryer housing of claim 1, wherein:

said port device defines a port flange having at least one pneumatic port in the form of at least one of the following: a compressor port, a pneumatics port, a ventilation port, and a regeneration port; and, said at least one pneumatic port is configured as a recess in the form of at least one channel and/or at least one bore formed in said port device or on a port side.

7. The air dryer housing of claim 6, wherein:

said port device is configured as a port assembly having a dryer flange and a compressor flange;

said at least one pneumatic port in said dryer flange is assigned a corresponding pneumatic remote port in said compressor flange; and, each pneumatic port is pneumatically connected to respective pneumatic remote ports via corresponding connecting lines.

8. The air dryer housing of claim 1, wherein said valve body has a valve body diameter that is less than a desiccant container diameter of the desiccant container, such that, in a radial intermediate space between said valve body and said desiccant container, there is formed a flow gap is formed for guiding said compressed-air flow past said valve body.

9. The air dryer housing of claim 1, wherein:

said valve piston has a relay surface and a switching surface;

said relay surface is larger than said switching surface;

said valve piston is of stepped cylindrical configuration; and, said compressed air is applied to said relay surface via a regeneration port to move said valve piston into a regeneration position wherein said switching surface lifts off from a ventilation valve seat of said valve body.

10. The air dryer housing of claim 1, wherein:

said valve body has a covering diaphragm fastened pressure-tight to said valve body to form a valve interior space; and, said covering diaphragm has, on a side facing toward the valve interior space, a restoring spring receptacle for receiving a restoring spring and/or, on a side averted from said valve interior space, a preload spring receptacle for receiving a preload spring, wherein the preload spring is configured to apply a preload force to the desiccant.

11. The air dryer housing of claim 10, further comprising a second preload spring receptacle for receiving a second preload spring.

12. The air dryer housing of claim 9, wherein a damping cushion is arranged between said ventilation valve seat and said switching surface and is formed from an elastomer; and/or, a damping disk is arranged between said valve piston and a covering diaphragm and is formed from an elastomer.

13. An air dryer arrangement comprising:

an air dryer housing including:

a desiccant container having a chamber fillable with desiccant and having a desiccant side;

a port device configured to connect said air dryer housing to a compressed-air supply providing a compressed-air flow;

said port device being connectable in a pressure-tight manner to said desiccant container on said desiccant side thereof;

said port device having, at said desiccant side, a valve body projecting into said chamber of said desiccant container;

a valve piston movable in said valve body;

said valve body and said valve piston conjointly defining a ventilation valve unit configured as a pneumatic relay valve;

said port device having a system-side port side and said port device being connectable to a compressed-air supply system; and, said valve piston being movable between a first position wherein said compressed-air flow passes through said desiccant container in a first direction and a second position wherein said compressed-air flow passes through said desiccant container in a second direction;

said air dryer arrangement further comprising:

a regeneration switching valve configured as a 2/2 directional solenoid valve; and, said regeneration switching valve being configured to selectively establish a pneumatic connection between a pneumatics main line and a regeneration port.

14. An air dryer arrangement comprising:

an air dryer housing including:

a desiccant container having a chamber fillable with desiccant and having a desiccant side;

a compressed-air supply;

a port device configured to connect said air dryer housing to said compressed-air supply providing a compressed-air flow;

said port device being connectable in a pressure-tight manner to said desiccant container on said desiccant side thereof;

said port device having, at said desiccant side, a valve body projecting into said desiccant container;

a valve piston movable in said valve body;

said valve body and said valve piston conjointly defining a ventilation valve unit configured as a pneumatic relay valve;

said port device having a system-side port side and said port device being connectable to a compressed-air supply system;

said valve piston being movable between a first position wherein said compressed-air flow passes through said desiccant container in a first direction and a second position wherein said compressed-air flow passes through said desiccant container in a second direction;

said desiccant being in loose and/or granular form;

said port device being configured to connect said air dryer housing to said compressed-air supply with said compressed-air supply being the compressed-air supply system for operating a pneumatic system; and, said compressed-air supply being the compressed-air supply system for operating a pneumatics system with said compressed-air flow.

15. A compressed-air supply system for providing a compressed-air supply to a pneumatic system including an air spring system of a vehicle, the compressed-air supply system comprising:

an air dryer housing; and, said air dryer housing including:

a desiccant container having a chamber fillable with desiccant and having a desiccant side;

a port device configured to connect said air dryer housing for providing a compressed-air flow;

said port device being connectable in a pressure-tight manner to said desiccant container on said desiccant side thereof;

said port device having, at said desiccant side, a valve body projecting into said chamber of said desiccant container;

a valve piston movable in said valve body;

said valve body and said valve piston conjointly defining a ventilation valve unit configured as a pneumatic relay valve;

said port device having a system-side port side and said port device being connectable to said compressed-air supply system; and, said valve piston being movable between a first position wherein said compressed-air flow passes through said desiccant container in a first direction and a second position wherein said compressed-air flow passes through said desiccant container in a second direction.

16. A vehicle having a pneumatic system including an air spring system, the vehicle comprising:

an air dryer housing including:

a desiccant container having a chamber fillable with desiccant and having a desiccant side;

a port device configured to connect said air dryer housing to a compressed-air supply providing a compressed-air flow;

said port device being connectable in a pressure-tight manner to said desiccant container on said desiccant side thereof;

said port device having, at said desiccant side, a valve body projecting into said chamber of said desiccant container;

a valve piston movable in said valve body;

said valve body and said valve piston conjointly defining a ventilation valve unit configured as a pneumatic relay valve;

said port device having a system-side port side and said port device being connectable to a compressed-air supply system; and, said valve piston being movable between a first position wherein said compressed-air flow passes through said desiccant container in a first direction and a second position wherein said compressed-air flow passes through said desiccant container in a second direction.

* * * * *